(12) United States Patent
Casey et al.

(10) Patent No.: US 11,923,943 B2
(45) Date of Patent: Mar. 5, 2024

(54) SYSTEMS AND METHODS FOR FLIGHT PLAN INITIATED BEAM/NULL FORMING ANTENNA CONTROL

(71) Applicant: Aura Network Systems, Inc., Mclean, VA (US)

(72) Inventors: Tamara Lynne Casey, Annapolis, MD (US); Michael Robert Gagne, Monrovia, MD (US)

(73) Assignee: AURA Network Systems, Inc., McLean, VA (US)

( * ) Notice: Subject to any disclaimer, the term of this patent is extended or adjusted under 35 U.S.C. 154(b) by 0 days.

(21) Appl. No.: 17/580,292

(22) Filed: Jan. 20, 2022

(65) Prior Publication Data

US 2022/0302968 A1 Sep. 22, 2022

Related U.S. Application Data

(60) Provisional application No. 63/237,801, filed on Aug. 27, 2021, provisional application No. 63/164,269, filed on Mar. 22, 2021.

(51) Int. Cl.
H04B 7/06 (2006.01)

(52) U.S. Cl.
CPC ........... *H04B 7/063* (2013.01); *H04B 7/0617* (2013.01); *H04B 7/0639* (2013.01)

(58) Field of Classification Search
CPC .................................................. H04B 7/063
(Continued)

(56) References Cited

U.S. PATENT DOCUMENTS 6,018,659 A   1/2000 Ayyagari et al.
6,167,239 A   12/2000 Wright et al.
(Continued)

FOREIGN PATENT DOCUMENTS

CA      2189494 A1   5/1997
CN    108173590 A    6/2018
(Continued)

OTHER PUBLICATIONS

International Search Report and Written Opinion dated Apr. 19, 2022, directed to International Application No. PCT/US2022/070050; 12 pages.

(Continued)

*Primary Examiner* — Lihong Yu
(74) *Attorney, Agent, or Firm* — Kubota & Basol LLP

(57) ABSTRACT

Presented herein are system and methods for implementing a flight plan initiated beam/null forming antenna. According to an aspect, a terrestrial (i.e., ground) to air communications network can include a beam/null steering antenna that can be configured to operate in conjunction with a spectrum management system to provide one or more communications links between an airborne radio and a ground-based operator. The beam/null steering antenna can also receive the flight plans of aircraft using the system from the spectrum management system. In one or more examples, the beam/null steering antenna can use the flight plan information provided the spectrum management system to determine if a signal received at the antenna is a known desired signal, a known undesired signal, or an unknown undesired signal. In one or more examples the antenna can be configured to direct a beam or null at a particular signal based on the determination.

45 Claims, 10 Drawing Sheets

(58) Field of Classification Search
USPC .......................................................... 375/262
See application file for complete search history.

(56) References Cited

U.S. PATENT DOCUMENTS

| | | | |
|---|---|---|---|
| 8,897,770 B1 | 11/2014 | Frolov et al. | |
| 8,914,022 B2 | 12/2014 | Kostanic et al. | |
| 9,185,603 B1 | 11/2015 | McCarthy | |
| 9,319,172 B2 | 4/2016 | Jalali et al. | |
| 9,596,053 B1* | 3/2017 | Marupaduga | H04W 88/08 |
| 10,304,343 B2 | 5/2019 | Mustafic et al. | |
| 10,354,536 B1* | 7/2019 | Hegranes | G08G 5/006 |
| 2001/0052875 A1* | 12/2001 | Kohno | G01S 3/325 |
| | | | 342/417 |
| 2005/0108374 A1 | 5/2005 | Pierzga et al. | |
| 2007/0072560 A1 | 3/2007 | Ishikawa | |
| 2012/0282962 A1 | 11/2012 | Madon et al. | |
| 2014/0024365 A1 | 1/2014 | Mitchell | |
| 2014/0274103 A1 | 9/2014 | Steer et al. | |
| 2015/0139073 A1 | 5/2015 | Buchwald et al. | |
| 2016/0119938 A1 | 4/2016 | Frerking et al. | |
| 2017/0059688 A1 | 3/2017 | Gan | |
| 2017/0215178 A1 | 7/2017 | Kim et al. | |
| 2017/0278410 A1* | 9/2017 | Byers | G08G 5/0026 |
| 2018/0164441 A1* | 6/2018 | Feria | H01Q 21/22 |
| 2018/0324881 A1 | 11/2018 | Gagne | |
| 2018/0375568 A1 | 12/2018 | De Rosa et al. | |
| 2019/0260462 A1 | 8/2019 | Axmon et al. | |
| 2019/0306675 A1 | 10/2019 | Xue et al. | |
| 2019/0331800 A1 | 10/2019 | Espeland et al. | |
| 2020/0154426 A1 | 5/2020 | Takács et al. | |
| 2020/0372808 A1 | 11/2020 | Carraway et al. | |
| 2021/0035457 A1 | 2/2021 | Pennapareddy | |
| 2021/0282129 A1 | 9/2021 | Kim et al. | |
| 2022/0166525 A1 | 5/2022 | De Rosa et al. | |
| 2022/0217706 A1 | 7/2022 | Casey et al. | |
| 2022/0383760 A1 | 12/2022 | Casey et al. | |
| 2023/0245571 A1 | 8/2023 | Casey et al. | |

FOREIGN PATENT DOCUMENTS

| | | |
|---|---|---|
| CN | 109450515 A | 3/2019 |
| CN | 112116830 A | 12/2020 |
| WO | 2018/178750 A1 | 10/2018 |
| WO | 2019/086821 A1 | 5/2019 |
| WO | 2020/113062 A1 | 6/2020 |
| WO | 2022/217530 A1 | 10/2022 |

OTHER PUBLICATIONS

International Search Report and Written Opinion dated Apr. 22, 2022, directed to International Application No. PCT/US2022/070272; 13 pages.

Non-Final Office Action received for U.S. Appl. No. 17/569,379, dated Mar. 3, 2023, 21 pages.

Final Office Action received for U.S. Appl. No. 17/569,379, dated Jul. 26, 2023, 22 pages.

International Search Report received for PCT Patent Application No. PCT/US2022/072699, dated Sep. 21, 2022, 5 pages.

International Search Report received for PCT Patent Application No. PCT/US2023/060402, dated Mar. 21, 2023, 5 pages.

Apaza et al., "A New Spectrum Management Concept For Future NAS Communications", 2020.

Jacob et al., "Cognitive Radio for Aeronautical Communications: A Survey", IEEE Access, vol. 4, May 19, 2016, pp. 3417-3443.

Knoblock et al., "Investigation and Evaluation of Advanced Spectrum Management Concepts for Aeronautical Communications", 2021 Integrated Communications Navigation and Surveillance Conference (ICNS), 2021, pp. 1-12.

Reyes et al., "A Cognitive Radio System for Improving the Reliability and Security of UAS/UAV Networks", IEEE, 2015.

Wang et al., "Blockchain Enabled Verification for Cellular-Connected Unmanned Aircraft System Networking", Future Generation Computer Systems, May 2021, pp. 233-244.

* cited by examiner

SYSTEMS AND METHODS FOR FLIGHT PLAN INITIATED BEAM/NULL FORMING ANTENNA CONTROL

CROSS-REFERENCE RELATED APPLICATIONS

This application claims the priority to U.S. Provisional Application No. 63/237,801, filed on Aug. 27, 2021, and U.S. Provisional Application No. 63/164,269, filed on Mar. 22, 2021, the entire contents of each of which are incorporated herein by reference.

FIELD

This disclosure relates to RF spectrum management in aviation communications network, and more specifically, to systems and methods for allocating RF narrowband spectrum channels between airborne assets to facilitate communications with a ground-based communications network.

BACKGROUND

One of the critical features of air safety for both manned and unmanned flights is the ability for airborne assets to communicate with the ground so as to relay operationally critical communications. Ensuring that an airborne asset can maintain a continuous and uninterrupted communications link to the ground ensures that the airborne asset is able to receive necessary information from ground controllers as well as transmit necessary information to the ground controllers at any and all points during a given flight.

The proliferation of airborne assets, and specifically unmanned aerial vehicles (UAVs) has complicated the task of ensuring that each airborne asset has a continuous bidirectional communications channel with ground stations. UAVs are now capable of flying long distances across a diverse set of topographic regions, all the while having specialized communications requirements with the ground. For instance, UAV operators based on the ground must be in constant communication with the UAV not only to provide instructions to the UAV from the ground, but to also receive critical telemetry from the UAV that informs the ground-based operator about the UAV's operational status.

Ensuring the performance of the critical data link between a ground base station and remote radios for aviation operations in airspace is critical to supporting the safety requirements of manned, unmanned, as well as, piloted flights. Data links need to meet the reliability, integrity and availability performance targets set forth by regulators. Ensuring a continuous data link for remote radios can be challenging in an environment in which there are many airborne assets transiting an airspace at any given time. The availability of usable RF spectrum specifically can be a challenging issue. With increasing air traffic comes an increasing potential for the communications of one aircraft to interfere with the communications of another during a flight. Spectrum interference within the aviation network can further be exacerbated when aircraft in a given network are transiting across large geographic areas and thus must rely on multiple ground base stations during its flight to maintain a continuous communications link with the ground.

SUMMARY

According to an aspect, a terrestrial (i.e., ground) to air communications network can include a beam/null steering antenna that can be configured to operate in conjunction with a spectrum management system to provide one or more communications links between an airborne radio and a ground-based operator. In one or more examples, the beam/null steering antenna can include a plurality of transmit and receive elements capable of transmitting and receiving radio frequency (RF) signals). In one or more examples, the transmit and receive elements can be steerable and thus allow for the beams and nulls transmitted by the antenna to be pointed in a specific direction. In one or more examples, the beam/null steering antenna can simultaneously transmit a plurality both desired signals (i.e., beams) and nulls and at a plurality of targets. The beam/null steering antenna can be configured to ensure that the beams and nulls do not conflict with one another (i.e., interfere with one another), thereby ensuring that each beam and null transmitted by the antenna receives minimal cross-channel interference from other beams and nulls being transmitted by the beam/null steering antenna.

According to an aspect, the beam/null steering antenna can also receive the flight plans of aircraft using the system from the spectrum management system. The flight plans can allow for the antenna to know the expected locations and times at those locations of airborne radios transiting the airspace covered by the network of ground based antenna. In one or more examples, the beam/null steering antenna can use the flight plan information provided the spectrum management system to determine if a signal received at the antenna is a known desired signal, a known undesired signal, or an unknown undesired signal. In the event that the signal is a known desired signal, the beam/null steering antenna can work to ensure that a beam is pointed in the direction of the known desired signal so as to facilitate a communications link between the ground and the airborne radio. In one or more examples, if the signal is determined to be a known undesired signal (i.e., a signal from another aircraft in the airspace that may interfere with a desired signal), the beam/null steering antenna can work to ensure that a null is pointed in the direction of the known undesired signal so as to mitigate and/or minimize the effect that the known desired signal on a desired signal being serviced by the beam/null steering antenna.

According to an aspect, if a signal received by the beam/null steering antenna does not match to any of the received flight plans of both desired and undesired signals, then in one or more examples, the antenna can work to point a null in the determined direction of the unknown signal and can also communicate with a spectrum monitoring system of the base station (to which the antenna is connected to) so as to identify the unknown and undesired signal. In one or more examples, providing the beam/null steering antenna with the flight plans submitted to the spectrum management system can allow for the antenna to ensure that beams and nulls are transmitted by the antenna in a manner that does not cause RF conflicts between the beams and nulls and allows for beams to be directed to the desired airborne radio signal and nulls to the undesired airborne radio signals.

In one or more examples, the noise cancellation techniques implemented into the beam/null steering antennas can allow the system to maximize the desired airborne signal and reduce the undesired airborne radio interference. In one or more examples, since the network knows the location and RF configurations of both the desired airborne radio signal and the undesired airborne radio signal, interference digital noise cancellation can be implemented more efficiently. Noise Canceling techniques such as Successive Noise Cancellation and Multiuser Detection, can be enhanced by the Beam/Null Forming Steering Antennas including the known RF characteristics of the desired airborne radio signal and undesired airborne radio interference.

According to an aspect, A method for operating a beam and null steerable antenna, the method includes receiving one or more flight plans, wherein each flight plan of the one or more flight plans comprises timing, location, and altitude information for a flight that is to fly in one or more coverage areas of an aviation communications network, receiving signal information, wherein the signal information comprises location information for a signal being transmitted in the one or more coverage areas of the aviation communications network, determining if the received signal information matches a flight plan of the one or more received flight plans, if it is determined that the receive signal information matches a flight plan of the one or more received flight plans: operating one or more elements of the antenna to transmit a signal to a location indicated by the location information of the received signal information, and tracking the signal with the one or more elements of the antenna based on the flight plan of the one or more flight plans that matches the received signal information.

Optionally, the flight plan comprises information about the radio configuration of an aircraft performing the flight plan.

Optionally, the one or more elements of the antenna are operated based on the information about the radio configuration of the aircraft performing the flight plan.

Optionally, the flight plan comprises information about whether an airborne radio associated with the flight plan is a desired signal, and wherein the beam and null steerable antenna is configured to point an RF beam at a desired signal so as to maintain a communications link between the airborne radio associated with the desired signal and the antenna.

Optionally, wherein the flight plan comprises information about whether an airborne radio associated with the flight plan is an undesired signal, and wherein the bean and null steerable antenna is configured to point an RF null at an undesired signal so as to reduce RF interference caused by the undesired signal.

Optionally, the signal information is received from a spectrum monitoring device configured to receive and process radio frequency (RF) signals received at a monitoring antenna of the base station.

Optionally, the signal information is received by the beam and null steerable antenna at one or more receive elements of the antenna.

Optionally, the flight plan comprises information about whether an airborne radio associated with the flight plan is a desired signal, and wherein determining if the received signal information matches a flight plan of the one or more received flight plans comprises determining if the received signal information matches a flight plan of a desired signal.

Optionally, the method comprises: if the received signal information matches a flight plan of a desired signal: operating the one or more elements of the antenna to transmit a RF beam in a direction associated with the location information for the signal being transmitted in the one or more coverage areas of the aviation communications network.

Optionally, the method comprises: if the received signal information matches a flight plan of a desired signal: operating the one or more elements of the antenna to track the received signal based on the flight plan of the desired signal that is determined to match the received signal.

Optionally, the flight plan comprises information about whether an airborne radio associated with the flight plan is an undesired signal, and wherein determining if the received signal information matches a flight plan of the one or more received flight plans comprises determining if the received signal information matches a flight plan of a undesired signal.

Optionally, the method comprises: if the received signal information matches a flight plan of a undesired signal: operating the one or more elements of the antenna to transmit a RF null in a direction associated with the location information for the signal being transmitted in the one or more coverage areas of the aviation communications network.

Optionally, the method comprises: if the received signal information matches a flight plan of an undesired signal: operating the one or more elements of the antenna to track the received signal based on the flight plan of the undesired signal that is determined to match the received signal.

Optionally, if the received signal information does not match a flight plan of a desired signal or an undesired signal then the method comprises: operating the one or more elements of the antenna to transmit a RF null in a direction associated with the location information for the signal being transmitted in the one or more coverage areas of the aviation communications network.

Optionally, if the received signal information does not match a flight plan of a desired signal or an undesired signal: transmitting the signal information to a spectrum monitoring device configured to receive and process radio frequency (RF) signals received at a monitoring antenna of the base station.

Optionally, the spectrum monitoring device is configured to determine information associated with an identity of an airborne radio associated with the signal information received from the beam and null steering antenna.

Optionally, tracking the signal with the one or more elements of the antenna based on the flight plan of the one or more flight plans that matches the received signal information comprises adjusting the location of the transmitted signal based on the flight plan.

Optionally, wherein the beam and null steerable antenna includes a plurality of receive elements configured to receive RF energy from a source.

The method of claim 18, wherein one or more of the receive elements of the plurality of receive elements are configured to received horizontally polarized RF energy from a source.

Optionally, one or more of the receive elements of the plurality of receive elements are configured to receive vertically polarized RF energy from a source.

Optionally, the beam and null steerable antenna includes a plurality of transit elements configured to transmit RF energy.

Optionally, one or more of the transmit elements of the plurality of transmit elements are configured to transmit horizontally polarized RF energy.

Optionally, one or more of the transmit elements of the plurality of transmit elements are configured to transmit vertically polarized RF energy.

According to an aspect, a beam and null steerable antenna beam and null steerable antenna includes: one or more elements configured to receive and transmit RF energy, a memory, one or more processors. wherein the memory stores one or more programs that when executed by the one or more processors, cause the one or more processors to: receive one or more flight plans, wherein each flight plan of the one or more flight plans comprises timing, location, and altitude information for a flight that is to fly in one or more coverage areas of an aviation communications network, receive signal information, wherein the signal information comprises location information for a signal being transmitted in the one or more coverage areas of the aviation communications network, determine if the received signal information matches a flight plan of the one or more received flight plans, if it is determined that the receive signal information matches a flight plan of the one or more received flight plans: operate the one or elements of the antenna to transmit a signal to a location indicated by the location information of the received signal information, and track the signal with the one or more elements of the antenna based on the flight plan of the one or more flight plans that matches the received signal information.

Optionally, the flight plan comprises information about the radio configuration of an aircraft performing the flight plan.

Optionally, the one or more elements of the antenna are operated based on the information about the radio configuration of the aircraft performing the flight plan.

Optionally, the flight plan comprises information about whether an airborne radio associated with the flight plan is a desired signal, and wherein the beam and null steerable antenna is configured to point an RF beam at a desired signal so as to maintain a communications link between the airborne radio associated with the desired signal and the antenna.

Optionally, the flight plan comprises information about whether an airborne radio associated with the flight plan is an undesired signal, and wherein the bean and null steerable antenna is configured to point an RF null at an undesired signal so as to reduce RF interference caused by the undesired signal.

Optionally, the signal information is received from a spectrum monitoring device configured to receive and process radio frequency (RF) signals received at a monitoring antenna of the base station.

Optionally, the signal information is received by the beam and null steerable antenna at one or more receive elements of the antenna.

Optionally, the flight plan comprises information about whether an airborne radio associated with the flight plan is a desired signal, and wherein determining if the received signal information matches a flight plan of the one or more received flight plans comprises determining if the received signal information matches a flight plan of a desired signal.

Optionally, the one or more processors are caused to: if the received signal information matches a flight plan of a desired signal: operate the one or more elements of the antenna to transmit a RF beam in a direction associated with the location information for the signal being transmitted in the one or more coverage areas of the aviation communications network.

Optionally, the one or more processors are caused to: if the received signal information matches a flight plan of a desired signal: operate the one or more elements of the antenna to track the received signal based on the flight plan of the desired signal that is determined to match the received signal.

Optionally, the flight plan comprises information about whether an airborne radio associated with the flight plan is an undesired signal, and wherein determining if the received signal information matches a flight plan of the one or more received flight plans comprises determining if the received signal information matches a flight plan of a undesired signal.

Optionally, the one or more processors are caused to: if the received signal information matches a flight plan of a undesired signal: operate the one or more elements of the antenna to transmit a RF null in a direction associated with the location information for the signal being transmitted in the one or more coverage areas of the aviation communications network.

Optionally, the one or more processors are caused to: if the received signal information matches a flight plan of an undesired signal: operate the one or more elements of the antenna to track the received signal based on the flight plan of the undesired signal that is determined to match the received signal.

Optionally, if the received signal information does not match a flight plan of a desired signal or an undesired signal then the one or more processors are caused to: operate the one or more elements of the antenna to transmit a RF null in a direction associated with the location information for the signal being transmitted in the one or more coverage areas of the aviation communications network.

Optionally, if the received signal information does not match a flight plan of a desired signal or an undesired signal then the one or more processors are caused to: transmit the signal information to a spectrum monitoring device configured to receive and process radio frequency (RF) signals received at a monitoring antenna of the base station.

Optionally, the spectrum monitoring device is configured to determine information associated with an identity of an airborne radio associated with the signal information received from the beam and null steering antenna.

Optionally, tracking the signal with the one or more elements of the antenna based on the flight plan of the one or more flight plans that matches the received signal information comprises adjusting the location of the transmitted signal based on the flight plan.

Optionally, the beam and null steerable antenna includes a plurality of receive elements configured to receive RF energy from a source.

Optionally, one or more of the receive elements of the plurality of receive elements are configured to received horizontally polarized RF energy from a source.

Optionally, one or more of the receive elements of the plurality of receive elements are configured to receive vertically polarized RF energy from a source.

Optionally, the beam and null steerable antenna includes a plurality of transit elements configured to transmit RF energy.

Optionally, one or more of the transmit elements of the plurality of transmit elements are configured to transmit horizontally polarized RF energy.

Optionally, one or more of the transmit elements of the plurality of transmit elements are configured to transmit vertically polarized RF energy.

According to an aspect, a non-transitory computer readable storage medium storing one or more programs for operating a beam and null steerable antenna, for execution by one or more processors of an electronic device that when executed by the device, causes the device to: receive one or more flight plans, wherein each flight plan of the one or more flight plans comprises timing, location, and altitude information for a flight that is to fly in one or more coverage areas of an aviation communications network, receive signal information, wherein the signal information comprises location information for a signal being transmitted in the one or more coverage areas of the aviation communications network, determining if the received signal information matches a flight plan of the one or more received flight plans, if it is determined that the receive signal information matches a flight plan of the one or more received flight plans: operate one or elements of the antenna to transmit a signal to a location indicated by the location information of the received signal information, and track the signal with the one or more elements of the antenna based on the flight plan of the one or more flight plans that matches the received signal information.

Optionally, the flight plan comprises information about the radio configuration of an aircraft performing the flight plan.

Optionally, the one or more elements of the antenna are operated based on the information about the radio configuration of the aircraft performing the flight plan.

Optionally, the flight plan comprises information about whether an airborne radio associated with the flight plan is a desired signal, and wherein the beam and null steerable antenna is configured to point an RF beam at a desired signal so as to maintain a communications link between the airborne radio associated with the desired signal and the antenna.

Optionally, the flight plan comprises information about whether an airborne radio associated with the flight plan is an undesired signal, and wherein the bean and null steerable antenna is configured to point an RF null at an undesired signal so as to reduce RF interference caused by the undesired signal.

Optionally, the signal information is received from a spectrum monitoring device configured to receive and process radio frequency (RF) signals received at a monitoring antenna of the base station.

Optionally, the signal information is received by the beam and null steerable antenna at one or more receive elements of the antenna.

Optionally, the flight plan comprises information about whether an airborne radio associated with the flight plan is a desired signal, and wherein determining if the received signal information matches a flight plan of the one or more received flight plans comprises determining if the received signal information matches a flight plan of a desired signal.

Optionally, the device is caused to: if the received signal information matches a flight plan of a desired signal: operate the one or more elements of the antenna to transmit a RF beam in a direction associated with the location information for the signal being transmitted in the one or more coverage areas of the aviation communications network.

Optionally, the device is caused to: if the received signal information matches a flight plan of a desired signal: operate the one or more elements of the antenna to track the received signal based on the flight plan of the desired signal that is determined to match the received signal.

Optionally, the flight plan comprises information about whether an airborne radio associated with the flight plan is an undesired signal, and wherein determining if the received signal information matches a flight plan of the one or more received flight plans comprises determining if the received signal information matches a flight plan of a undesired signal.

Optionally, the device is caused to: if the received signal information matches a flight plan of a undesired signal: operate the one or more elements of the antenna to transmit a RF null in a direction associated with the location information for the signal being transmitted in the one or more coverage areas of the aviation communications network.

Optionally, the device is caused to: if the received signal information matches a flight plan of an undesired signal: operate the one or more elements of the antenna to track the received signal based on the flight plan of the undesired signal that is determined to match the received signal.

Optionally, if the received signal information does not match a flight plan of a desired signal or an undesired signal then device is caused to: operate the one or more elements of the antenna to transmit a RF null in a direction associated with the location information for the signal being transmitted in the one or more coverage areas of the aviation communications network.

Optionally, if the received signal information does not match a flight plan of a desired signal or an undesired signal, the device is caused to: transmit the signal information to a spectrum monitoring device configured to receive and process radio frequency (RF) signals received at a monitoring antenna of the base station.

Optionally, the spectrum monitoring device is configured to determine information associated with an identity of an airborne radio associated with the signal information received from the beam and null steering antenna.

Optionally, tracking the signal with the one or more elements of the antenna based on the flight plan of the one or more flight plans that matches the received signal information comprises adjusting the location of the transmitted signal based on the flight plan.

Optionally, the beam and null steerable antenna includes a plurality of receive elements configured to receive RF energy from a source.

Optionally, one or more of the receive elements of the plurality of receive elements are configured to received horizontally polarized RF energy from a source.

Optionally, one or more of the receive elements of the plurality of receive elements are configured to receive vertically polarized RF energy from a source.

Optionally, the beam and null steerable antenna includes a plurality of transit elements configured to transmit RF energy.

Optionally, one or more of the transmit elements of the plurality of transmit elements are configured to transmit horizontally polarized RF energy.

Optionally, one or more of the transmit elements of the plurality of transmit elements are configured to transmit vertically polarized RF energy.

BRIEF DESCRIPTION OF THE FIGURES

The invention will now be described, by way of example only, with reference to the accompanying drawings, in which.

DETAILED DESCRIPTION

Figure 1:
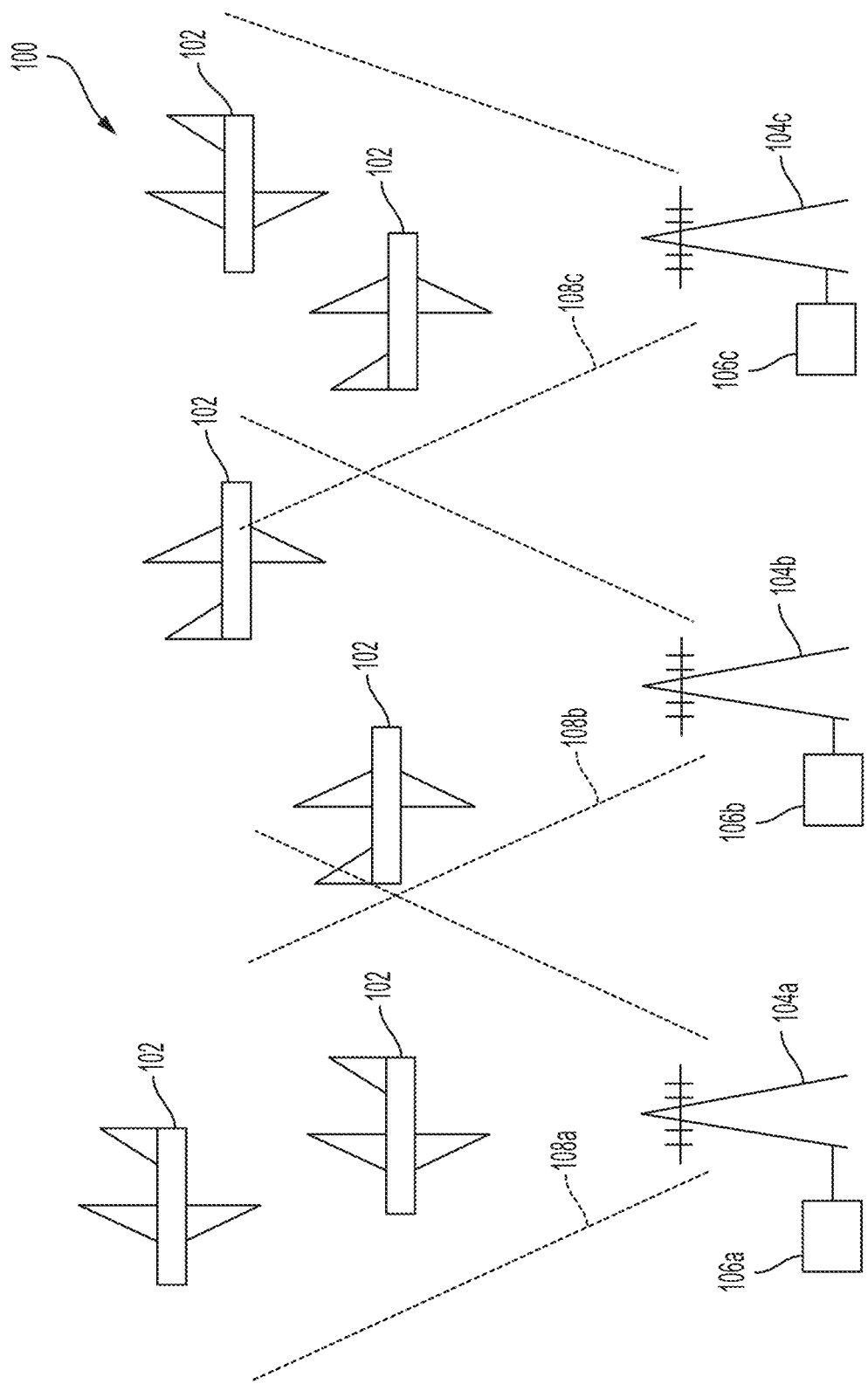
FIG. 1 illustrates an aviation communications network according to examples of the disclosure.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Described herein are systems and methods for implementing and operating a beam/null steering antenna. In one or more examples, the aviation communications network can include a beam/null steering antenna that can be configured to operate in conjunction with a spectrum management system to provide one or more bi-directional communications links between an airborne radio and a ground-based operator. In one or more examples, the beam/null steering antenna can include a plurality of transmit and receive elements capable of transmitting and receiving radio frequency (RF signals). In one or more examples, the transmit and receive elements can be steerable and thus allow for the beams and nulls transmitted by the antenna to be pointed in a specific direction, determined by the spectrum management system. In one or more examples, the beam/null steering antenna can simultaneously transmit a plurality both desired signals (i.e., beams) and nulls and at a plurality of targets.

In one or more examples, the beam/null steering antenna can receive tasking from the flight plan based spectrum management system that is configured to manage communications between airborne radios and ground operations over a terrestrial to air communications network. In one or more examples, the antenna can use the flight plan information to determine if a signal in the network is a known desired signal, a known undesired signal, or an unknown undesired signal. In one or more examples, if the antenna detects a signal and classifies it as a known desired signal based on the received flight plan information, the antenna can point a beam at the location of the desired signal so as to establish a communications link between the airborne radio and the ground-based operator. In one or more examples, if the received signal is determined to be a known undesired signal (based on the flight plan information), the antenna can point a nulling signal at the undesired signal so as to minimize or completely eliminate the ability for the undesired signal to interfere with desired signals in the network.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

When an aircraft is in-flight, it is critical that the aircraft have a reliable and continuous communication link with the ground. For instance, in the context of unmanned aircraft vehicles (UAVs) in which an aircraft is flown and controlled from the ground by an operator, the operator will need to be continuously updated with information regarding the status of the UAV. In order to facilitate unmanned flight, UAVs must have continuous contact with operators on the ground so that they can receive instructions and also so that they can transmit vital telemetry information to let the operators know the status of the flight. However, as air traffic increases across the world, providing a reliable and continuous communications link to an aircraft for the entire duration of its flight can become a complicated endeavor. A ground-to-air communications network can include many aircraft, ground stations, and geographic areas that need to coordinated so as to ensure that a single aircraft in the network can be provided with a reliable and continuous communications channel during its flight.

FIG. 1 illustrates an aviation network according to examples of the disclosure. The example of FIG. 1 illustrates an exemplary communications network 100 that can be configured to provide communications between one or more ground base stations 104a-c and one or more aircraft 102 in-flight. In one or more examples, the communications network 100 can include one or more ground base stations 104a-c. Each of the ground base stations 104a-c include one or more antennas configured to transmit communications from the ground to the one or more aircraft 102. In one or more examples, each ground base station 104a-c can be configured to provide transmissions within a coverage area 108a-c. For example, ground base station 104a can be configured to transmit RF spectrum radio signals over geographic coverage area 108a. Ground base station 104b can be configured to transmit RF spectrum radio signals over geographic coverage area 108b, and ground base station 104c can be configured to transmit RF spectrum radio signals over geographic coverage area 108c. In one or more examples, geographic coverage areas 108a-c can be three-dimensional areas that not only cover a certain range of latitude and longitude, but also provide coverage to areas from the ground up until a maximum serviceable altitude.

In one or more examples, each aircraft 102 can be handed over from one ground base station to the next during the duration of its flight. For instance, at the beginning of a flight, ground base station 104a can be responsible for providing a communications channel between an operator on the ground and the aircraft while the aircraft 102 is within the coverage area 108a. If during the flight, the aircraft transits out of the coverage area 108a into coverage area 108b, then responsibility for providing the communications channel can transition from ground base station 104a to ground station 104b. If during the flight, the aircraft 102 transits out of coverage area 108b into coverage area 108c, then responsibility for providing the communications channel can transition from ground base station 104b to ground station 104c. In this way, the communications network 100 can be configured to ensure that an aircraft has an established communications channel with at least one ground base station at any point along its flight plan, so long as the flight plan passes through at least one coverage area at any point during its flight.

In one or more examples, each base station 104a-c can be communicatively coupled to a base station controller 106a-c respectively. Thus, in one or more examples, ground base station 104a can be communicatively coupled to base station controller 106a, ground base station 104b can be communicatively coupled to base station controller 106b, and ground base station 104c can be communicatively coupled to base station controller 106c. As described in further detail below, each base station controller can be configured to implement an RF based communications channel between a ground operator and an aircraft 102 when the aircraft is transiting through the coverage area 108a-c that corresponds to the base station that the controller is configured to operate. In one or more examples, implementing an RF based communications channel can include modulating signals transmitted by the operator to a RF spectrum frequency assigned to the aircraft 102, applying an appropriate modulation scheme to the transmitted signals, and applying any other physical layer communications protocols such as error correction codes.

In one or more examples, the goal of the communications network 100 can be to provide any given aircraft 102 operating within the network with a continuous and reliable RF spectrum channel throughout the duration of its flight. In one or more examples, providing a continuous and reliable RF spectrum to an aircraft can include providing a single RF spectrum channel (i.e., slot) to an aircraft that it can reliably use throughout the duration of its flight to communicate with the ground. In one or more examples, each aircraft in a given airspace can communicate with the ground using a dedicated RF spectrum channel (i.e., a frequency range in the RF spectrum that is unique to the aircraft and can be only used by that individual aircraft to transmit and receive communications from the ground). In order to facilitate efficient flight operations, in one or more examples, each ground base station 104a-c coupled to its corresponding base station controller 106a-c can be configured to ensure that each aircraft in its coverage area 108a-c is able to communicate with the ground using communications transmitted in the RF spectrum channel assigned to that aircraft.

In one or more examples, each ground base station 104a-c can include one or more antennas that are mounted to the base station and are configured to transmit signals from one or more ground operators (i.e., pilots) to one or more airborne radios mounted on the aircraft 102. In one or more examples, and as described in further detail below, the one or more antennas can be implement as an array of computer-controlled antennas that can be electronically "steered" to point in different directions depending on the location of the aircraft in the network 100. In one or more examples, the antenna can implemented as a phased array antenna, which allows for a signal to be directed in a particular direction without having to physically move the antennas. By pointing the antenna in the direction of the target (i.e., the airborne radio that will transmit to and receive data from the antenna), the antenna is able to maximize the signal to noise ratio of the communications link between the antenna and the airborne radio thereby ensuring a stable communications link between the ground and the airborne radio.

Figure 2:
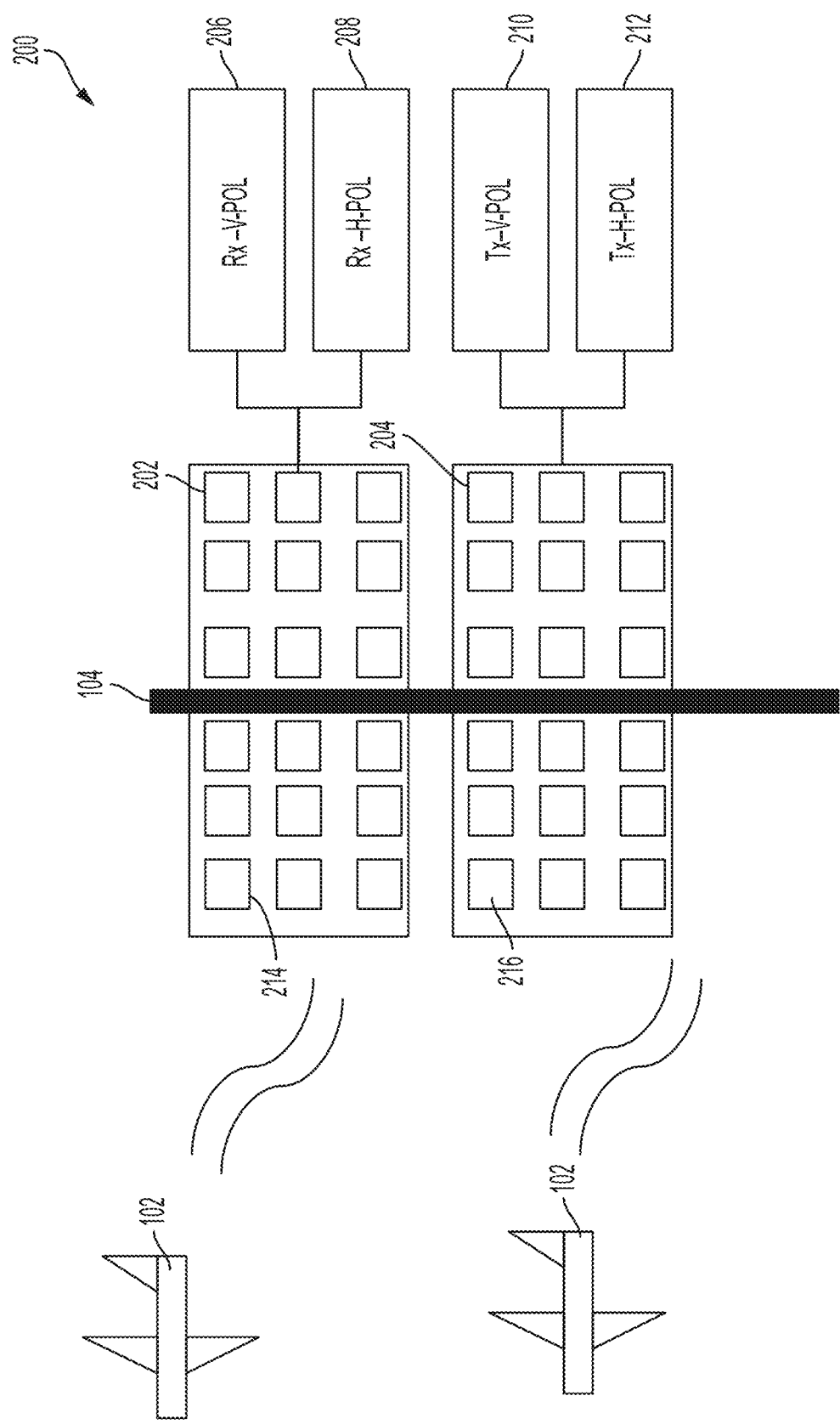
FIG. 2 illustrates an exemplary steerable antenna according to examples of the disclosure.

FIG. 2 illustrates an exemplary steerable antenna according to examples of the disclosure. In one or more examples, the antenna 200 of FIG. 2 can be mounted to a ground base station tower 104. In one or more examples of the disclosure, the antenna 200 can include a receive array 202 and a transmit array 204. In one or more examples, the transmit array 204 can be configured to transmit signals from the ground base station 104 to one or more aircraft 102 (and more specifically to each of the airborne radios located on the aircraft). In one or more examples, the transmit array 204 can include a plurality of antenna elements 216 with each element 216 of the transmit array 204 configured to transmit a signal. In one or more examples, and in the example of a phased array implementation, the antenna elements 216 of the transmit array 204 can be collectively operate to point one or more signals at a desired geographic location as discussed above. In one or more examples of the disclosure, each transmit array element 216 can be independently steerable so as to be pointed in the direction where an intended receiver is located.

In one or more examples, the receive array 202 can be configured to receive signals from one or more aircraft 102 (and more specifically to each of the airborne radios located on the aircraft) at the ground base station 104. In one or more examples, the receive array 202 can include a plurality of antenna elements 214 with each element 214 of the receive array 202 configured to receive a signal. In one or more examples, and in the example of a phased array implementation, the antenna elements 214 of the receive array 202 can be collectively operated receive signals from a desired geographic location as discussed above. In one or more examples of the disclosure, each receive array element 214 can be independently steerable so as to be pointed in the direction where a signal to be received is located.

In one or more examples, the antenna array elements 214 and 216 can be configured to produce radiation patterns that include both lobes (i.e., where the gain of a signal is maximized) and nulls (i.e., where the gain of a signal is minimized to nearly zero). In one or more examples, the radiation pattern (i.e., the lobes and nulls) of the antenna can be dynamically reconfigured such that lobes can be pointed towards locations where desired signals are to be directed (i.e., an airborne radio that the base station wants to establish a communications link) and nulls of the radiation pattern of the antenna can be pointed in the direction of interferers or unknown signals that could potentially interfere with communications between the antenna and airborne radios transiting the airspace of the ground base station. In one or more examples, the antenna elements 214 and 216 can be physically moved or in the case of a phased array the phases can be adjusted so that the nulls and lobes can be pointed in specific directions as required to optimally operate the antenna.

In one or more examples, the antenna 200 can include processing logic that can ensure that the lobe and null patterns do not interference with one another during operation of the antenna. For instance, if the nulls and lobes of the antenna are directed such that a propagation path of a null and the propagation path of a null cross one another, then the two signals can conflict with one another. A conflict between signals can cause the overall performance of the antenna to be degraded and the antenna 200 may not be able to adequately provide a high enough signal to noise ratio to desired signals so as to reliably provide a communications channel to those airborne radios to communicate with ground-based operators. In one or more examples, the antenna 200 can be configured to examine requests to point lobes and nulls at specific geographic areas and ensure that the antenna fulfills those requests in a manner that does not cause signal conflicts between the requests.

In one or more examples, the antenna 200 can include separation horizontal and vertical polarization receiving and transmitting elements. By including separate polarizations, the antenna 200 can effectively double its transmit and receive capacity. The use of horizontal and vertical polarizations is meant as an example only and shouldn't be seen as limiting. In one or more examples, the antenna 200 can be configured to receive unpolarized and circularly polarized signals as well. As shown in FIG. 2, antenna 200 can include a plurality of receive vertically polarized elements 206 configured to receive the vertically polarized portions of a signal. In one or more examples, the antenna 200 can include a plurality of receive horizontally polarized elements 208 configured to receive the horizontally polarized portions of a signal. In one or more examples, the antenna 200 can include a plurality of transmit vertically polarized elements 210 configured to transmit vertically polarized signals to one or more airborne radios. In one or more examples, the antenna 200 can include a plurality of transmit horizontally polarized elements 212 configured to transmit horizontally polarized signals to one or more airborne radios.

Figure 3:
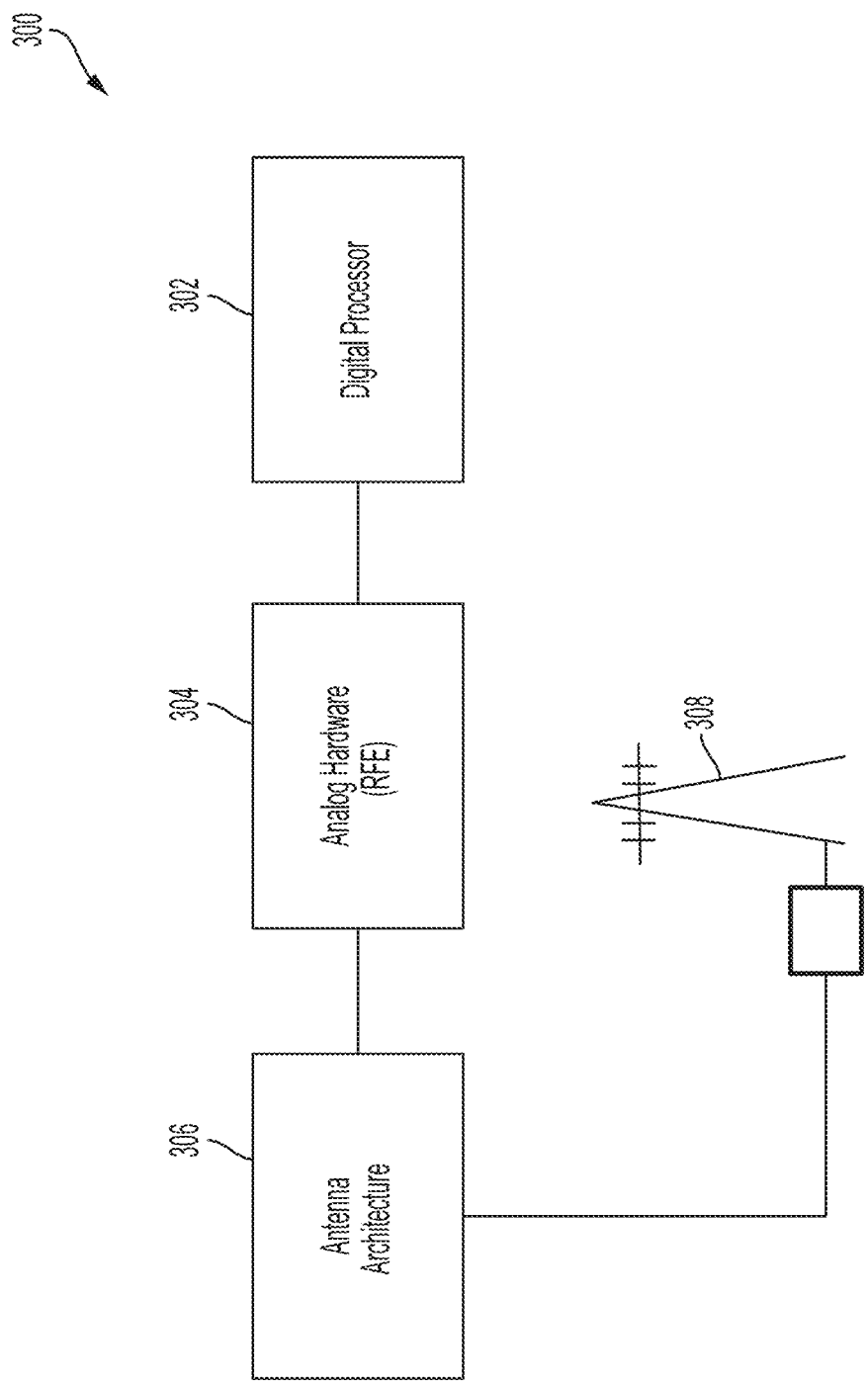
FIG. 3 illustrates an exemplary implementation of a receiver and transmit array within a beam/null steering antenna according to examples of the disclosure.

In addition to the antenna elements themselves, the antenna 200 of FIG. 2 can include a plurality of processing components that can work collectively to operate the antenna so that the antenna can provide communications link between airborne radios in the coverage area of the base station and ground-based operators. FIG. 3 illustrates an exemplary implementation of a receiver and transmit array within a beam/null steering antenna according to examples of the disclosure. In the example of FIG. 3, the receive and transmit arrays can be communicatively coupled to a processing system 300 that can be collectively configured to operate the antenna so as to provide communications channels between airborne radios and the ground, while also working to minimize the effects of unwanted or undesired signals that are also propagating in the coverage area (as described in further detail below).

In one or more examples, the system 300 can include digital processing components 302 that are configured to collectively perform digital beamforming. In one or more examples, digital beamforming can include the process of digitally adding data streams going to and coming from the antenna elements to generate composite signals that reflect the signals provided and received from the antenna elements. In one or more examples, the system 300 can include one or more analog components 304. In one or more the analog components 304 can include one or more converters (such as digital-to-analog converters (DACs) and analog-to-digital converters (ADCs)) that are configured to act as the interface between the analog components 304 and the digital components 302. In one or more examples, the DACs can be configured to convert digital signals from the digital processor that are being sent to the antenna to analog signals. The ADCs can be configured to convert analog signals from the antenna to digital signals for processing by the digital processing components 302. In one or more examples, the analog components 304 can include analog up and down converters that are configured to up-convert and down-convert signals being transmitted to and received from the antenna elements respectively.

In one or more examples, the system 300 can include antenna architecture elements 306 which can include front end modules and antenna elements. In one or more examples, the front end modules can include the amplifiers and switches that are collectively operated to effect specific beam patterns (i.e., lobes and nulls) as required by the antenna. Thus, in one or more examples, and as described above, the antenna architecture components 306 can work to point the lobes and nulls of the antennas as required by the needs of the antenna depending on the locations of airborne radios that require communication channels and interference signals that the antenna can work to minimize or eliminate. In one or more examples, the nulls, rather than being pointed directly at a target aircraft, can additionally be targeted to lower the overall carrier to noise ratio of various communication channels being operated by a ground station.

Also illustrated in FIG. 3 is an example physical architecture 308 of the antenna elements. In one or more examples, the transmit and receive antenna elements can be disposed in a circular architecture as shown at 308 so that the transmit and receive elements can provide 360 degree coverage to the coverage area of the base station at which the antenna lies.

As described in detail below, the beam/null forming antenna described above with respect to FIGS. 2 and 3 can work within a spectrum management system that can coordinate communications between one or more base stations in the network and one or more airborne radios transiting the communications network managed by the spectrum management system. The capabilities of the antenna can work in conjunction with and also use information provided by a spectrum management system, to enhance the operation of the antenna so that it can provide one or more airborne radios in the network with a reliable and continuous communications channel during its flight through the network. In one or more examples, and as described in further detail below, the Beam/Null Forming Steering Antenna system can be enhanced by the submission of a flight plan of an aircraft with an airborne radio requesting spectrum resources from the spectrum management systems of the aviation network. By using the flight plan provided by the spectrum management system the antenna system can have knowledge of where all the airborne radios of the network are located, or expected to be located at all times. This knowledge can include deviations which may be necessary based on updated/amended/appended flight plan filings—which can occur in real time based on instructions from air traffic control. This knowledge can allow for the planning and assignment of the traffic channels to include the benefit gained through the use of the position assisted beam/null forming steering antennas by ensuring the airborne radios are located in a predefined location that maximizes the effectiveness of the antenna system. The telemetry of the Airborne Radios collected real time can be provided to the antenna system and tracked in comparison to the flight plan. In one or more examples, the telemetry of location and elevation are provided can be provided by external resources like GPS, Enhanced RTK GPS, and alternative GPS based upon triangulation of multiple ground-based navigation beacons, aircraft barometer and radar altimeters.

Assigning aircraft a dedicated RF spectrum channel to use throughout the duration of its flight can be difficult. Often times a given base station is responsible for providing communications channels to hundreds of flights at any given moment in time, with each aircraft in the coverage needing its own dedicated RF spectrum channel so that it can communicate with the ground uninterrupted by other air traffic in the air space. Furthermore, since flights can traverse multiple base stations during a given flight, assigning a dedicated RF spectrum to a flight that can be used throughout the flights duration to have non-contended communications with the ground can require a high level of coordination to ensure that no two aircraft transit the same coverage area using the same RF spectrum channel. Furthermore, as the RF environment in a given coverage area is dynamic, not only is there a need to make sure that no two flights in a given coverage area operate on the same RF channel, but there is also a need to make sure that any communications between an aircraft and the ground will not be interfered with from various noise sources that can operate in a given coverage area. These noise sources can include the RF Noise Floor, related or unrelated network Co-Channel or Adjacent Channel Interference as well as Out of Band Interference sources.

In order to coordinate the assignment of RF spectrum channels to aircraft, in one or more examples, a system for Dynamic Spectrum Management that is configured to support safe aviation operations can be implemented to coordinate RF spectrum channel allocation to aircraft operating in a given communications network. In one or more examples, the spectrum management system can allocate the spectrum and traffic channels in a deterministic way to ensure the radio resources are available between the ground base station and the airborne radios operating on aircraft in the network.

Figure 4:
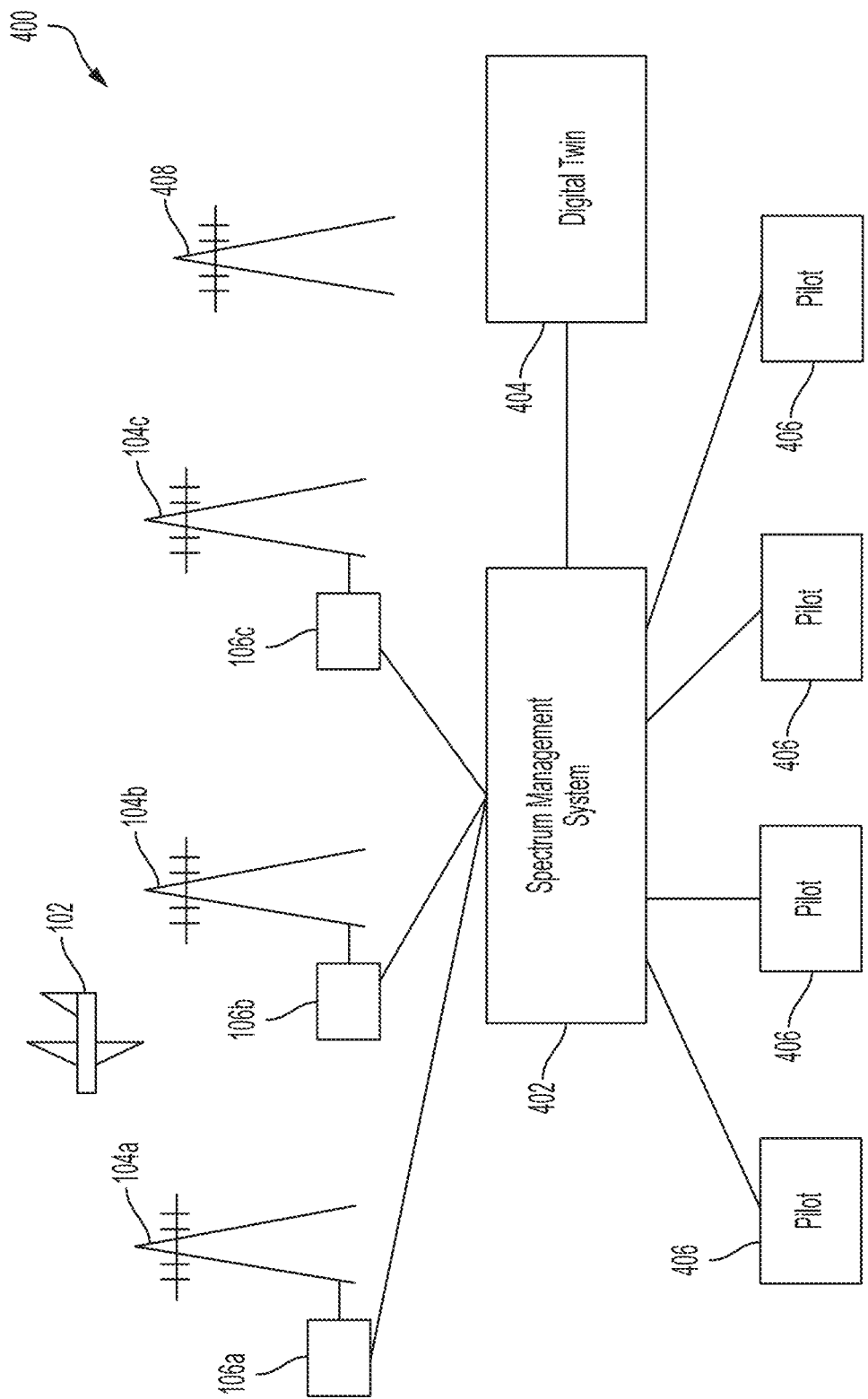
FIG. 4 illustrates an exemplary system for RF spectrum management of aviation communication networks according to examples of the disclosure.

FIG. 4 illustrates an exemplary system for RF spectrum management of aviation communication networks according to examples of the disclosure. In one or more examples of the disclosure, the communications network 400 of FIG. 4 can include the same components (i.e., aircraft 102, ground base stations 104a-c, and base station controller 106a-c) as the communications network 100 described above with respect to FIG. 1, but can also include one or more spectrum management system components (described in further detail below) that can manage the process of allocating RF spectrum channels to aircraft 102 in the network 400.

In one or more examples of the disclosure, one or more pilots/operators 406 can be connected to the network 400 in order to transmit data (such as command and control data) to the one or more aircraft 102. Each of the pilots 406 can be communicatively coupled to the network 400 through a spectrum management system 402 that can be configured to allocate RF spectrum channels to each of the aircraft 402 being controlled by the pilots 406. In one or more examples, the spectrum management system 402 can be configured to facilitate a communications link between each pilot 406 and their corresponding aircraft 102 by establishing an RF communications link using a specified RF spectrum channel allocated to each aircraft.

In one or more examples of the disclosure, the spectrum management system can be configured to manage each active communication link between an aircraft 102 and a pilot/operator 406. Thus, in one or more examples, if the spectrum management system 402 determines that a given communications link has been compromised or had degraded, the spectrum management system 402 can take action to adjust the communications link to mitigate the issue. For instance, in one or more examples, if a given RF spectrum channel being used by an aircraft 102 is no longer performing satisfactorily or to required specifications, the spectrum channel management system 402 can change the RF spectrum channel (described in detail below) to an alternative available channel in real-time to ensure that each aircraft maintains a reliable RF communications link. In one or more examples, if the pilot deviates from their advertised flight plan (for example by flying longer than anticipated) the spectrum management system 402 can be configured to take action (for instance by switching the RF channel) to ensure that any interruptions to the communications channel are mitigated.

In one or more examples of the disclosure, in addition to actively managing communication channels, the spectrum management system 402 can be configured to allocate and reserve one or more RF channels for a given flight to be used during the duration of the flight. As described in further detail below, the spectrum management system 202 can receive a flight plan from a pilot/operator 206 and based on the filed flight plan as well as other factors (such as the availability of the antenna) can allocate an RF channel to each flight in a deterministic manner that takes into account potential interference that may be encountered during the flight.

In one or more examples, the spectrum allocation process described above can be implemented by the spectrum management system 402, and/or can be processed in one or more separate components collectively referred to herein as a "digital twin." Due to the large volume of information and the potential for spectrum and/or traffic channel requests by tens of thousands of end users in a given airspace, a digital twin of the spectrum management system can be used to perform the required analysis without impacting the operational system. In one or more examples, and as illustrated in the example of FIG. 4, the digital twin 404 can be implemented separately from the spectrum management system 402 so as to reduce the processing load of the spectrum management system 402, thus leaving it free to perform the real-time operations associated with managing the active communications channels of aircraft transiting the airspace managed by the spectrum management system 402. Alternatively, the digital twin 404 can also be implemented as part of the spectrum management system such that both the real-time management of air communication links, and flight planning are performed by the same component.

In one or more examples, the digital twin 404 can be configured to receive one or more requests from the pilots 406 for spectrum to use during a given flight plan. The digital twin, using the flight plan provided by the pilot as well as other factors (described below) can determine what RF spectrum channels to allocate to an aircraft when its flight commences. Once requests are confirmed in the digital twin 404, execution and assignment of the communications channel on the operational spectrum management system 402 can be performed.

As described above, the spectrum management system 402 and the digital twin 404 can coordinate the RF spectrum needs of multiple aircraft in a given communications network so as to ensure that each individual aircraft can have access to a reliable and continuous communications channel with the ground during the entirety of its flight. In one or more examples, the spectrum management system 402 and the digital twin 404 can work in tandem to allocate and reserve RF spectrum channels for individual aircraft, and as described below, can monitor each individual communications link in-flight to ensure that the communications link is operating to its requirement.

Selecting an RF channel to allocate to a given flight can involve analyzing multiple variables to ensure that the selected channel will service the needs of an aircraft throughout the duration of its flight. In one or more examples, the spectrum management system 402 and the digital twin can analyze several variables such as the available spectrum resources, radio link throughput and performance requirements, location (including elevation), time-period as well as the radio frequency environment to assign a non-contended resource between the pilot and the aircraft. In one or more examples, the variables that influence channel selection can be populated by several internal and external components to the spectrum management system 402 that work together to match an aircraft to one or more RF channels for use during a flight as described below.

In one or more examples, each pilot (i.e., operator) in the communications network can interface with the communications network before and during their flight via the spectrum management system 402 and the digital twin 404. Before the flight, and as described below, the pilot can interface with the spectrum management system and digital twin to receive an RF spectrum channel allocation for use during their flight based on their filed flight plan and other variables. During the flight, the spectrum management system 402 can provision the allocated RF spectrum channel to both the aircraft and the pilot to establish a continuous communications link and the spectrum management system can monitor the link during the flight to make sure it is performing within specification.

In one or more examples of the disclosure, the network 400 can include one or more base stations that nomay or may not be connected such a point to point communication links to the spectrum management system 402. In one or more examples, a service provider who provides and maintains access to the spectrum management system 402 may not provide coverage to every desired geographic location. In one or more examples, in areas where a pilot may want to operate a flight but that does not fall within a coverage area of an existing base station, the service provider can provide the pilot with a temporary or portable base station 408. In one or more examples, the temporary/portable base station may not have a connection with the spectrum management system 402 and thus cannot receive/transmit information to the spectrum management system for the purposes of provisioning RF channels to aircraft. In one or more examples, these non-connected base stations will have operation plans submitted, into the Spectrum Management System and digital twin to be coordinated and geofenced for interference and coverage.

In one or more examples, the temporary/portable base station 408 can be used to setup point-to-point and multi-point links between the temporary/portable base station 408 and one or more aircrafts radios for flight operation. In one or more examples of the disclosure, the operator of a temporary/portable base station 408 can inform the service provider a "concept of operation" of the base station 408 that describes the number of aircraft, the times they will fly and the spectrum they will use to communicate with the aircraft. While the spectrum monitoring system 402 may not send real-time information to the temporary/portable base station 408, the spectrum management system 402 can use the concept of operation of the temporary/portable base station 208 to update the geofences (described in detail below) of the base stations 106a-c that are connected to the network and can work to ensure that flights that are flying within its network 400 do not cause interference with the flight operations of the temporary/portable base station 408. In one or more examples, the spectrum management system 402 can notify the operators of flights transiting the network 400 about the physical limitations to their operations caused by the temporary/portable base station 408 and can factor in the operations of the temporary/portable base station 408 when making RF spectrum slot allocations. In this way, while the spectrum management system 202 may not coordinate the operations of the temporary/portable base station 408, it can work to protect its own network (i.e., the base stations that are connected to the spectrum management system) from the operations of the temporary/portable base station's point-to-point operations.

Figure 5:
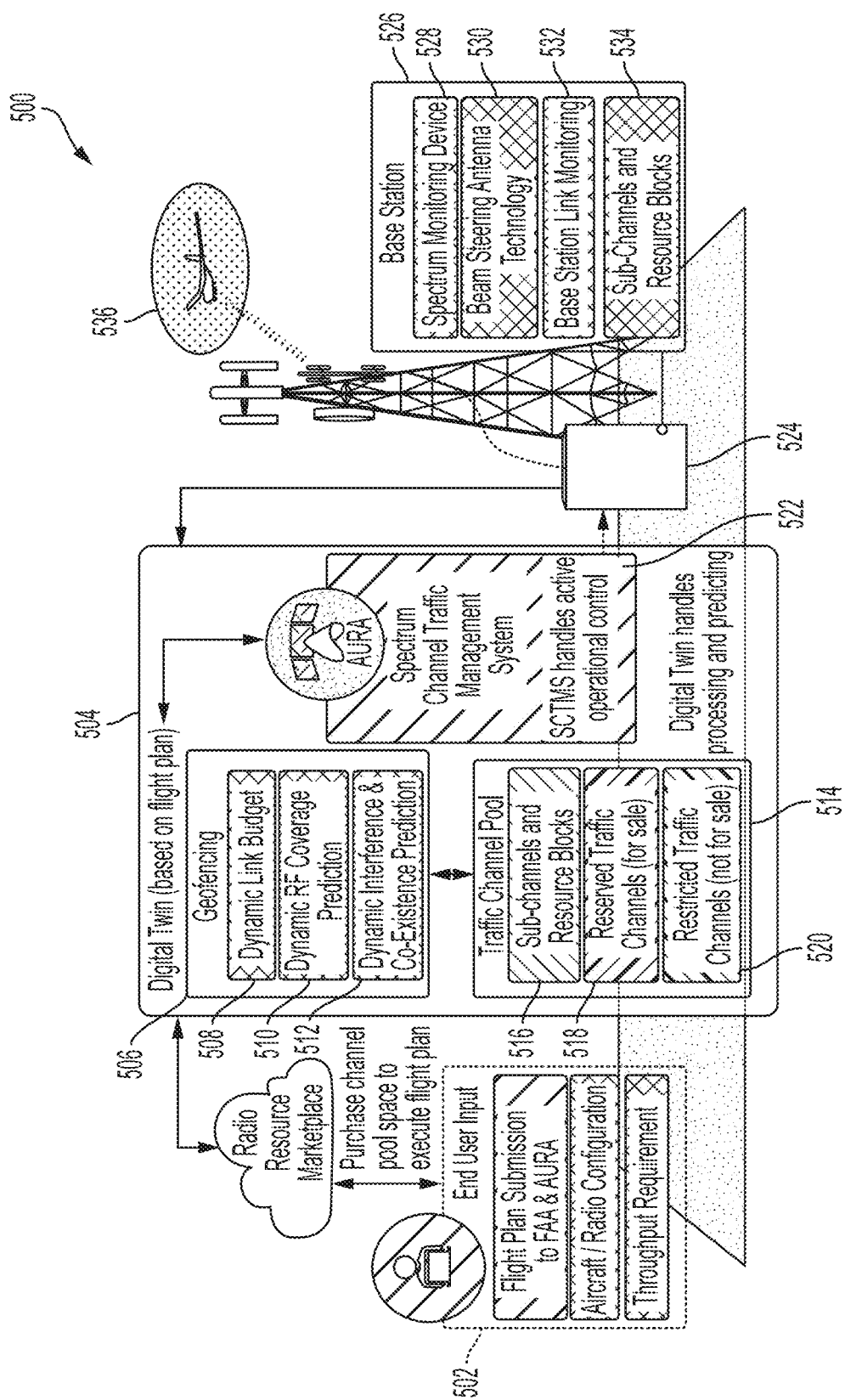
FIG. 5 illustrates an exemplary system for RF spectrum allocation and management according to examples of the disclosure.

FIG. 5 illustrates an exemplary system for RF spectrum allocation and management according to examples of the disclosure. In one or more examples, the system 300 can represent a single link of a communications network shown in FIGS. 1 and 4, and includes the components that manage the link between a pilot 502 and an aircraft 536. In one or more examples of the disclosure, the planning, creation, and operation of the link between the pilot 502 and the aircraft 536 can begin with the pilot 502 submitting information about their proposed flight to the digital twin 504. In one or more examples, and as shown in FIG. 5, the information transmitted by the pilot 502 to the digital twin 504 can include a flight plan, an aircraft/radio configuration, and a throughput requirement.

In one or more examples, the flight plan (which can also be referred to as an operations plan) submitted by the pilot 502 can include flight mission details such as the intended timing, altitude, location, and speed of the aircraft during a proposed flight. In one or more examples, the pilot 502 can submit the flight plan to both a regulatory body (such as the Federal Aviation Administration (FAA)) for approval and additionally send the flight plan to the spectrum management system via the digital twin 504 for the purpose of obtaining one or RF spectrum channels for use during the proposed flight. Additionally, and as described in further detail below, the flight plan information provided to the spectrum management system via the digital twin 504 can also be provided to a beam steering antenna 530 that in one or more examples can be implement according to the examples described above with respect to FIGS. 2-3. In addition to the flight plan, the pilot 502 can send additional information to the digital twin 504 that the digital twin can use to select and allocate a RF spectrum channel to the user. For instance, in one or more examples, the pilot 504 can transmit the configuration of the aircraft or radio so as to inform the digital twin 504 as to the type of radio that the pilot will be communicating with during the flight. Knowledge of the radio configuration can allow for the digital twin 504 to not only understand the spectrum needs of the aircraft but can also allow for the digital twin to determine and predict other necessary information about the communications channel such as the modulation scheme and the forward error correction code that will be active in-flight.

In one or more examples of the disclosure, the pilot 502 can also transmit a throughput requirement to the digital twin 504. In one or more examples, the throughput requirement can represent the amount of data that is needed to be sent and received over the communications link. In one or more examples, the throughput can either be specified by the pilot 502 or can be derived based on the aircraft/radio configuration submitted by the pilot. For instance, in one or more examples, a particular aircraft (such as a UAV) may need a certain throughput of data for the channel to properly operate its autopilot features and thus by knowing the aircraft type, the system can derive the throughput requirements for that flight. As described in detail below, the throughput requirement can be used to determine the total amount of bandwidth for an RF spectrum channel and can thus inform the selection of a channel or channels that has an effective bandwidth to accommodate the throughput requirements of the flight.

As described above, the digital twin 504 can use the flight plan and other information transmitted to it by the pilot 502 as well as other information to select one or more RF spectrum channels for use by the pilot 502 during their flight. In one or more examples, the digital twin 504 can access a traffic channel pool 514 to determine the availability of RF spectrum channels to service a given flight. In one or more examples, the traffic channel pool 514 can represent all of the RF spectrum channels that could possibly used to service a given flight. However, since there can be multiple aircraft in the network at any given time, and the need to reserve certain channels for emergency purposes (described in detail below), not every channel in the traffic channel pool 514 may be available for use by a particular aircraft during the times and locations required by a flight based on its flight plan.

In one or more examples, the digital twin 504 can select a channel or channels from the traffic channel pool 514, which as described above can include available sub-channels 516, reserved channels 518, and restricted traffic channels 520.

In order to allocate an RF channel to an aircraft, the digital twin 504, in one or more examples, can first determine if RF coverage is available for the aircraft during the entirety of its flight. To do so, in one or more examples, the digital twin 504 of the spectrum management system can "geofence" the coverage areas of each of the ground based stations in the network as shown at 506. In one or more examples, a "geofence" 506 can refer to a zone within a coverage area in which there is sufficient RF availability for flight traffic. In one or more examples, when a pilot 502 submits a flight plan, the system can query the geofences 506 to make sure there is RF availability throughout the path of the plan and at all altitudes expressed in the flight plan. In one or more examples of the disclosure, geofences can be shared with the pilot/operator of a flight and can be programmed into the auto-pilot of an aerial vehicle for use during a flight.

In one or more examples, a geofence can be created using a dynamic link budget 508 that is maintained by the digital twin 504. In one or more examples, each geofence 506 can have its own dynamic link budget 508. The dynamic link budget 358 can determine what the RF availability of a given geofence is at any particular moment in time, and can even predict RF availability for a given geofence in the future based on various parameters. In one or more examples, the dynamic link budget 508 can include such parameters as antenna gain, RF losses, receiver sensitivity, power, frequency, spectrum bandwidth, traffic channel size/quantities (i.e., sub-channels, resource blocks), quality of service (QOS) requirements, modulation, spectrum monitoring system results (described in further detail below) and the location of any known co-channel interferers. The dynamic link budget 508 can also include an RF safety margin to ensure a reliable communications signal in the geofence 506. In one or more examples, the operational spectrum management system 522 (described in detail below) can maintain a real-time version of the link budget that changes based on changing conditions in the RF environment. In one or more examples, the digital twin 504 can maintain a model of the link budget, and that dynamic link budget 308 can be used to predict RF conditions at a future time based on the times implicated by a given flight path. In one or more examples, the dynamic link budgets for each geofence can be validated using measurements of RF spectrum activity at each of the base stations in the area to ensure that the dynamic link budgets include the most up-to-date information and accurately reflect the RF environments that the dynamic link budgets are meant to model. In one or more examples, each geofence can be configured to predict coverage based upon components of the flight plans presented to the spectrum management system, the spectrum monitoring systems employed at each base states, the capabilities of the beam/null forming antennas at each base stations, as well as the known locations of other airborne radios. In one or more examples, the actual performance of radio links created at the base stations can be monitored and the information sent to the spectrum managements system for validation and modification of the geofences.

In one or more examples, and as part of the process of allocating RF spectrum channels to an aircraft, the digital twin 504 can cross reference the dynamic link budget with a calibrated RF coverage prediction tool 510. In one or more examples, the RF coverage prediction tool 510 uses appropriate RF prediction models, morphology, topology, antenna pattern characteristics, and antenna elevations to create the dynamic geofence coverage area based upon the remote radio configuration and user requirements. In one or more examples, the RF coverage prediction tool 510 can be used to generate a dynamic link budget for each geofence coverage area that a flight will transit based on its filed flight plan.

In one or more examples of the disclosure, the digital twin 504 can also be configured to determine whether the beam/null steering antenna can simultaneously provide the required lobes and nulls to the intended targets in a manner that will not conflict with one another. As described above, based on the flight plans submitted to the digital twin, the digital twin can have a priori knowledge of potential channel interference between aircraft. For instance, at a particular base station, an airborne radio transiting the airspace at the base station may experience channel interference from the communications being transmitted by an aircraft that it is transiting an adjacent coverage area that is simultaneously communicating with its own respective base station. In one or more examples, and as described above, the beam/null steering antenna can project a lobe (i.e., beam) at the desired signal (i.e., the airborne radio in its coverage area), and point a null signal towards the other aircraft in the adjacent coverage area so as to minimize the interference caused by that aircraft. However, as described above, the antenna can be required to coordinate its elements (i.e., the transmit and receive elements) so that the signals being received and transmitted with one another don't interfere with one another for instance by crossing beams and therefore creating conflicts within the antenna. As a single beam/null steering antenna can be operating numerous communications channels at once, the beam/null steering antenna must make sure that it operates those communications links in a manner that does not cause conflicts (i.e., the beams and nulls don't interfere with one another).

In one or more examples, the digital twin 504 as part of the process of ensuring that a received flight plan has RF availability over the duration of its flight, can simulate determine if the required lobes and nulls and their directions will cause a conflict in the antenna as described above. If a probably antenna conflict is detected, the digital twin 504 can alert the operator that the flight plan needs to be adjusted because of the conflict.

Figure 6:
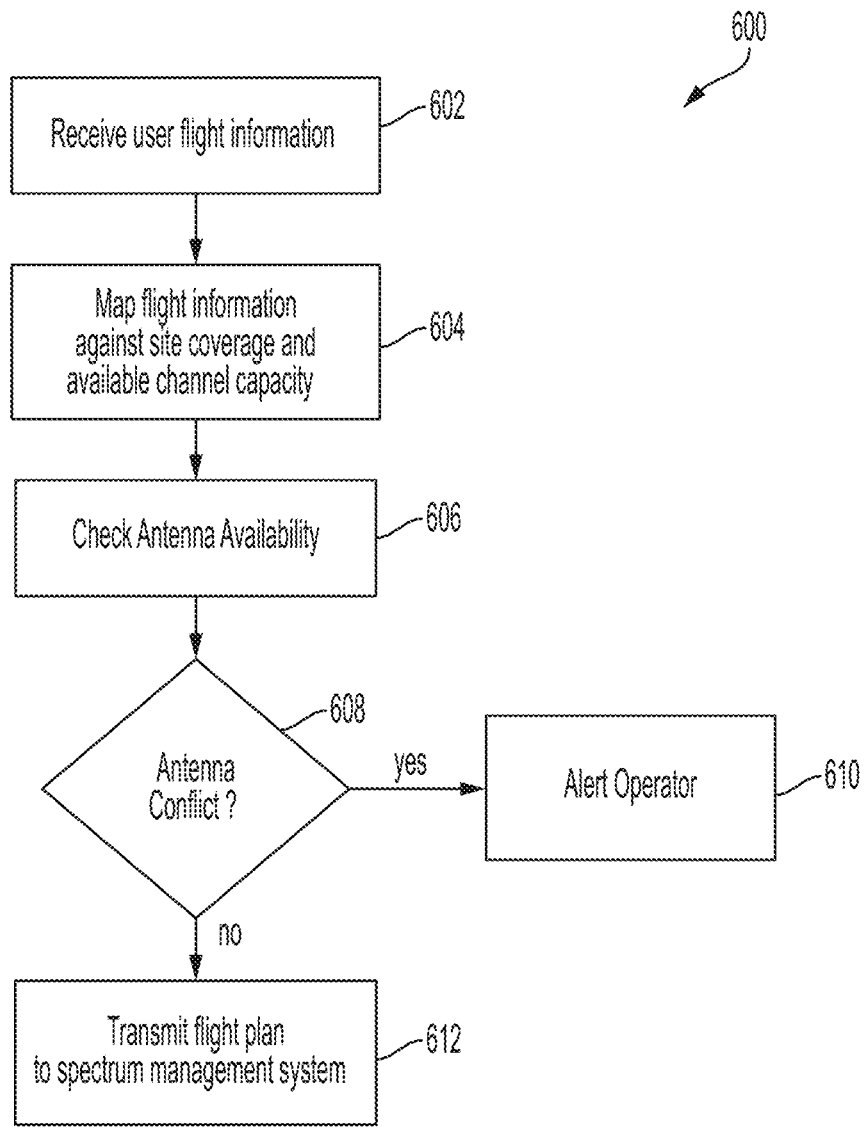
FIG. 6 illustrates an exemplary process for determining antenna availability according to examples of the disclosure.

FIG. 6 illustrates an exemplary process for determining antenna availability according to examples of the disclosure. In one or more examples, the process 600 of FIG. 6 can be performed at the digital twin 504, so that as part of determining RF availability for a received flight plan, the digital twin 504 can determine whether the beam/null steering antenna can provide the require lobes and nulls at the required trajectories to provide an overall reliable communications link for all of the aircraft transiting the coverage area of base station. In one or more examples, of the disclosure, the process 600 can begin at step 602 wherein a flight plan is received at the digital twin 504. In one or more examples, and as discussed above, the flight plan can include flight mission details such as the intended timing, altitude, location, and speed of the aircraft during a proposed flight.

In one or more examples, once the digital twin 504 receives the flight plan information at step 602, the process 600 can move to step 604 wherein the flight information taken from the received flight plan can be mapped against site coverage availability and available channel capacity as described above. At step 604, the digital twin can use the geofences 506 within a particular coverage area as well as one or more dynamic link budgets 508 (as described above) to determine if the proposed flight plan will have the available RF coverage at all times and locations proposed in the flight plan.

In one or more examples, the mapping of flight information against site coverage and available channel capacity performed at step 604 can assume that the beam/null steering antenna 530 will have antenna elements available to provide the required lobes (i.e., beams) to provide the communications channel to a given aircraft performing the flight plan, and also will have the required nulls to point at undesired signals that may interfere with the communications channel of an airborne radio performing the flight plan. However, as discussed above, the antenna may not be able to provide the required lobes and nulls if they cause a "conflict" in the antenna. As discussed above, a "conflict" can refer to the inability of the antenna to provide the required lobes and nulls to all of the aircraft in the coverage area of a base station, without causing cross-channel interference between the lobes and nulls. As described above, the beam/null steering antenna 530 can include a plurality of receive and transmit elements that are pointed in specific directions to provide lobes and nulls to specific geographic locations based on whether are particular signal is a desired signal or an undesired signal. In one or more examples, when an antenna receives instructions for where to provide lobes and where to provide nulls, it can process those instructions and determine which elements to point in what direction and which elements should provide lobes versus which elements should provide nulls. As part of that determination, the antenna can assign nulls and lobes as well as their directions to each individual element on the antenna. In order to avoid cross-channel interference, the antenna can assign the elements in a manner so that the transmitted lobes and nulls will not cross paths with one another. In other words, the antenna can assign each element so that the elements transmitted lobe or null will not cross paths with another lobe or null being transmitted by another element.

Thus, in one or more examples, and at step 606, the digital twin 504 can determine whether a given flight plan can be executed by an antenna in a manner that will not cause conflicts between beams. This determination at step 606 can be based on the current flight plan being assessed, other received flight plans that will be transiting the airspace during the current flight plan's route, and the location of known interferers that will be present during the performance of the flight plan. While the system may have RF availability as determined at step 604, that RF availability can rely on an assumption that the antenna can properly supply the required nulls and lobes to the aircrafts and interferers during operation of the flight plan. At step 606, the process 600 can determine whether that assumption is valid.

Once a check of the antenna's availability is made at step 606, the process 600 can move to step 608 wherein a determination is made as to whether the flight plan received at step 602 causes a conflict in the antenna. If it is determined at step 608 that a conflict exists, then the process 600 can move to step 610 wherein an operator of the system can be alerted to the conflict, and further alerted that the flight plan will be required to be adjusted in order to avoid the conflict determined at step 606. If however, it is determined that there is no conflict at step 608, then the process 600 can move to step 612 wherein the flight plan is transmitted to the spectrum management system 522. In one or more examples, the spectrum management system 522 can transmit the flight plan to the ground station controller 524, which (as described in detail further below) can then transmit the flight plan to the beam/null steering antenna so that the antenna can use that information during operation of the antenna.

Returning to the example of FIG. 6, in one or more examples, if it is determined via the dynamic link budget/budgets and/or antenna availability that a given flight plan may not be able to sustain a reliable communications channel throughout its flight, then the pilot 502 can be notified that their flight plan must be altered in order to give the aircraft 536 and pilot 502 the communications channel needed for the duration the flight. In one or more examples, if it is determined that the flight plan is serviceable, then in one or more examples of the disclosure, the specific RF spectrum channel or channels allocated to the flight from the traffic channel pool can be cross-referenced against a dynamic interference and co-existence prediction tool 512 ("interference tool") to determine if the particular frequency allocated to the flight as described above has the potential to interfere or be interfered with by another flight in the network. In one or more examples, the interference tool 512 can be configured to calculate known co-channel interferences that may occur during a flight. In one or more examples, co-channel interference can be caused by other remote radios operating in the network that can be distributed geographically and in altitude across the geographic coverage areas that a given flight will transit based on its flight plan. If it is determined that a co-channel interference could render a given channel allocation, then in or more examples, the digital twin 354 can select another channel or channels from the traffic channel pool and analyze the allocated channel using the interference tool 512 to determine if the channel will be reliable and available throughout the flight plan as transmitted by the pilot 502. In one or more examples, the spectrum management system can use the interference tool 512 to set one or more exclusion zones (i.e., where aircraft are not allowed to fly). Additionally, the spectrum management system can set one or more exclusion zones based on various regulatory requirements, interference, point-to-point operations, and alternative technology operations including satellite or terrestrial communications networks.

Thus, as described above, the dynamic link budget 508 (in conjunction with the dynamic RF coverage prediction tool 510) can be configured to determine if a given flight plan will have RF coverage at all points and times during the flight plan, while the interference tool 512 can be configured to ensure that the channel allocated from the traffic channel pool 514 will not be subject to a harmful amount of interference during the flight. As described above, if the dynamic link budget 508 or the interference tool 512 determine that a reliable RF link cannot be established during the flight, or that a channel that meets the needs of the flight plan is not available during the proposed time of the flight, then in one or more examples, the digital twin 504 can inform the pilot 502 that the flight plan needs to be adjusted.

As described above, the digital twin 504 can be responsible for allocating spectrum and planning operations for a flight, before the flight is to take place. However, the actual operations of the communications channel can be handled by a separate spectrum management system 522. In one or more examples, the digital twin 504 and the spectrum management system 504 can be implemented as a single system. Alternatively, the digital twin 504 and the spectrum management system 522 can be implemented as separate systems. In one or more examples of the disclosure, the spectrum management system 522 can be responsible for managing all of the communications link that are operating in a given communications network. Because the spectrum management system 522 is operating in real-time and must make decisions that can affect multiple communications link, in one or more examples, it can be advantageous to implement the digital twin 504 and the spectrum management system 522 on separate systems such that the operations of the digital twin 304 will not impact the speed at which the spectrum management system 322 performs its operations.

In one or more examples, and as described below, the spectrum management 522 can be responsible for implementing and managing the communications links for all flights in a given aviation communications network. Thus, once the spectrum requests are confirmed by the digital twin 504, execution and assignment of the communications channel with the allocated channel or channels can be performed on the spectrum management system 522.

As described above, the spectrum management system 522 can be responsible for not only implementing all of the communication channels between the pilots 502 and the flight 536 in a given communications network, but can also be responsible for monitoring the links in real-time to ensure that they are operating according to their requirements during flight. In order to perform its implementation and monitoring tasks, in one or more examples, the spectrum management system 522 can be in communication with the each of the base stations 526 of the communications network via the base station controller 524 described above with respect to FIGS. 1 and 4. In one or more examples of the disclosure, each base station in the network can include one or more components and tools to assist the spectrum management system 522 in setting up and monitoring communication links in real-time as aircraft 536 transit the coverage area of the base station. The base station controller 524 can be communicatively coupled to the base station controller as to access the components and tools necessary to implement and monitor the communication links that the spectrum management system is charged with setting up and maintaining such as one or more antenna elements and tools used to monitor the RF environment of a given base station.

In one or more examples of the disclosure, the spectrum management system 522 can have access to and control a spectrum monitoring device 528 located at each base station 526 in the communications network. In one or more examples, the spectrum monitoring device can include one or more hardware components (such as antennas and sensors) that are collectively configured to monitor the RF environment of the base station 526. A spectrum monitoring device can be located at each and every base station in the communications network and can be configured to continuously measure the active RF environment of a base station for interference.

Figure 7:
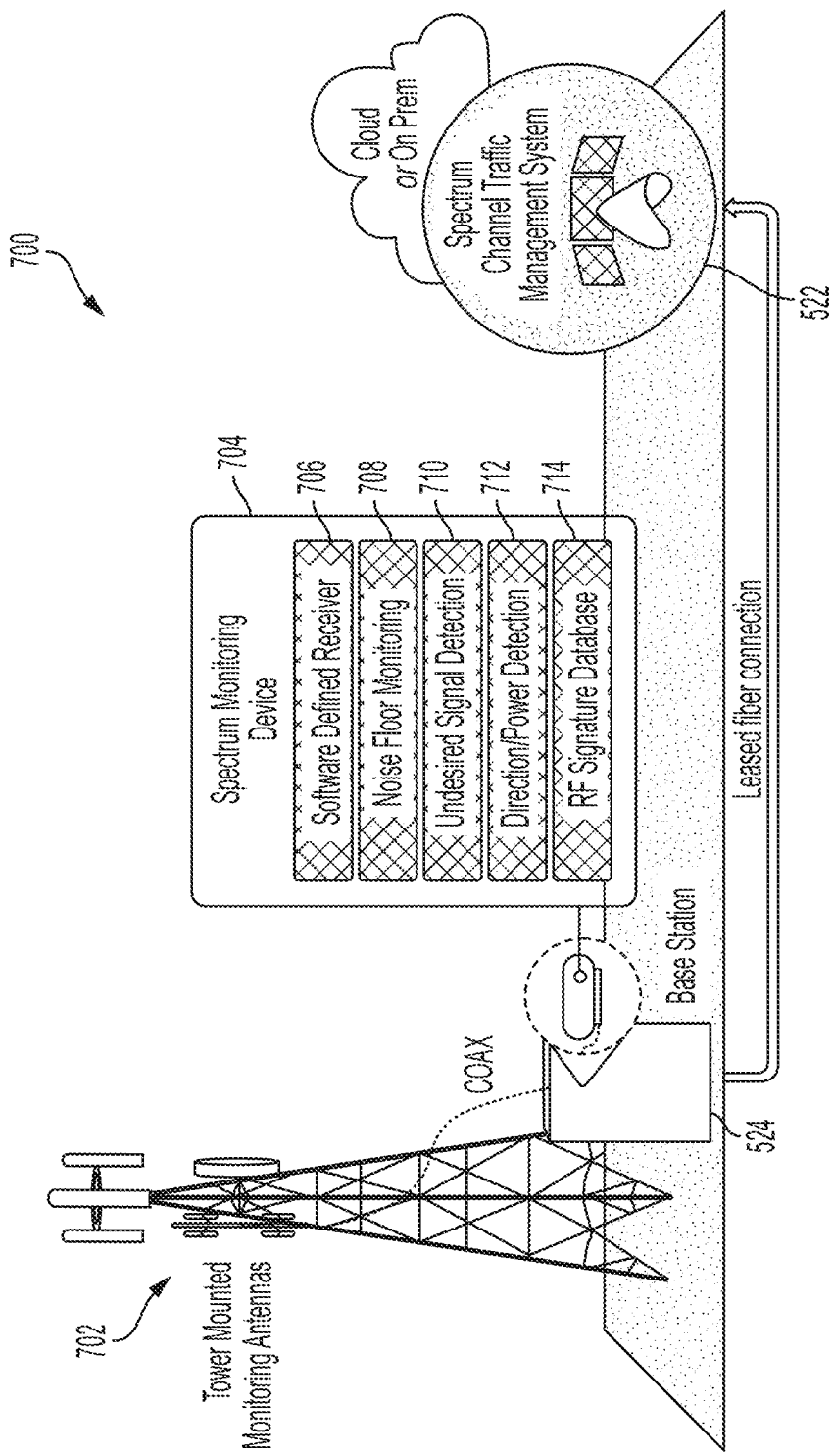
FIG. 7 illustrates an exemplary spectrum monitoring device according examples of the disclosure.

FIG. 7 illustrates an exemplary spectrum monitoring device according examples of the disclosure. In one or more examples the spectrum monitoring device 704 can be implement in the base station controller 524 which can communicate information about the spectrum to the digital twin and the spectrum management updates so as to automatically and in real-time update the geofences managed by the spectrum management system. The base station controller 524 can be communicatively coupled (for example by a coax connection) to one or more tower mounted monitoring antennas 702 that can act as the sensors that the spectrum monitoring device uses to monitor the RF environment of the base station. In one or more examples, the spectrum monitoring device 704 can include a software defined receiver 706 that can be configured to receive and process RF signals received by the tower mounted monitoring antennas 702. The software defined receiver can be used by one or more components of the spectrum monitoring device 704 to perform the analysis required to monitor the RF environment of the base station.

In one or more examples, the spectrum monitoring device 704 can include a noise floor monitoring component 608 that is configured to measure the noise floor of the base station. In one or more examples of the disclosure, the spectrum monitoring device 704 can include an undesired signal detection component 710 that is configured to detect any RF signals that are not expected at the base station. In one or more examples, the spectrum management system 522 can have knowledge of the active RF signals that should be seen by the base station based on the flights operating at the base station. Thus, in one or more examples, the undesired signal detection component 710 can be configured to determine if there is any RF energy in the RF coverage area of the base station that shouldn't be there and can potentially act as an unwanted external interference to the one or more communications links being implemented at the base station by the spectrum management system 522.

In addition to detecting unwanted RF signals, the spectrum monitoring device 704 can include a direction/power detection component 712 that can detect the precise power and direction of the unwanted signal. As described in detail below, the base station can include a beam steering antenna that can be utilized to minimize or eliminate unwanted and potentially interfering RF signals. Thus, the direction/power detection component 712 can be used to determine at what power and direction the unwanted signal is coming from and can use a beam steering antenna to nullify or minimize the unwanted signal.

In one or more examples, the spectrum monitoring device 704 can include a RF signature database 714. The RF signature database 714 can allow for the spectrum monitoring device to compare any identified and unwanted RF signals against a database of known RF signature for identification. In one or more examples, if the RF signature of an unwanted interferer (such as a malicious user who is using the spectrum without permission) can be identified using the RF signature database, then the incident can be reported to a regulatory authority for potential action against the malicious user.

In one or more examples, the spectrum management system 522 can utilize the data generated by the spectrum monitoring device 704 to adjust the one or more communication channels in its charge so as to ensure that each communication link performs to its desired level of performance. Referring back to FIG. 5, and as described above, the base station 526 can include one or more beam steering antenna components 530 configured to mitigate or eliminate unwanted RF signals from the base station coverage area. In one or more examples, RF interference can come from a known interference source such as a high altitude aircraft flying over an adjacent airspace, or from an uncooperative source such as a malicious user who is using the RF spectrum without permission. As a defense against these types of interferences, in one or more examples, the base station 526 can include a beam/null forming steering antenna 530 that can point a null at the interferer and work to either eliminate or substantially reduce the interference that the interferer may be causing to aircraft operating at the base station.

In one or more examples, the beam/null steering antenna 530 can use flight plan information submitted by a pilot to the spectrum management system 522 to assign resources of the antenna in a pre-define, de-conflicted manner that reduces interference. In one or more examples, and as described in further detail below, the beam/null steering antenna 530 can use the flight plans submitted to the spectrum management system 522 to direct beams (i.e., lobes) to desired airborne radio signals and direct nulls to undesired airborne radios. In one or more examples, and as described in further detail below, the beam/null steering antenna 530 can use the flight plan information received from the spectrum management system to track both the desired and undesired signals in its network to ensure that the configuration of the antenna is updated in real-time so as to optimize performance of the communications links being serviced by the antenna.

Figure 8:
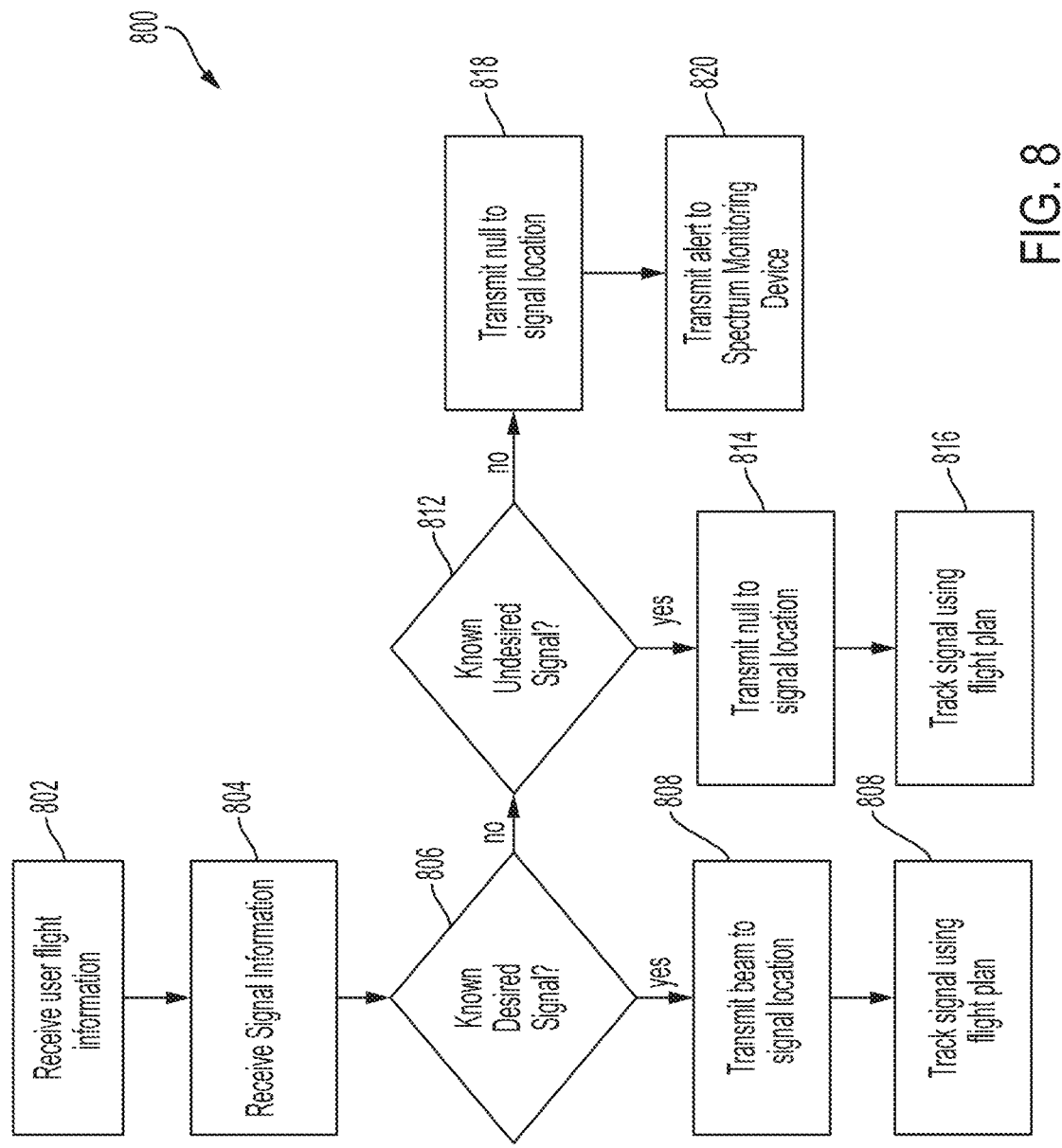
FIG. 8 illustrates an exemplary process for operating a beam/null steering antenna using flight plan information according to examples of the disclosure.

FIG. 8 illustrates an exemplary process for operating a beam/null steering antenna using flight plan information according to examples of the disclosure. In one or more examples, the process 800 of FIG. 8 can be performed at a beam/null steering antenna such as the one described above with respect to FIGS. 2-3. The process 800 is described in the context of a spectrum management system described above with respect to FIG. 5, however the context should not be seen as limiting, and in one or more examples, the process 800 can be implemented using an antenna operating a different context than the example provided in FIG. 5.

In one or more examples, the process 800 of FIG. 8 can begin at step 802 wherein the antenna receives flight plan information. As described above, as part of the spectrum management system process, a pilot can transmit their flight plan to a spectrum management system 522, which can verify that there is RF availability for the flight plan, that the antenna can accommodate the flight plan without conflict, and the spectrum management system 522 (through the digital twin 504) can allocate one or more RF spectrum channels to the aircraft for its flight. In one or more examples, the spectrum management system 522 can transmit the flight plan to the ground base controller 524 which can in turn relay the information to the beam/null steering antenna 530 at step 802. As described above, the flight plan can include flight mission details such as the intended timing, altitude, location, and speed of the aircraft. The flight plan information provided to beam/null steering antenna at step 802 can include flight plan information for desired signals (i.e., aircraft using the base station to communicate with the ground) as well as the flight plan for known undesired signals (i.e., signals that are transiting other base stations, but may still cause interference with desired signals in the current coverage area). In one or more examples, the spectrum management system 522, in addition to sending the flight plans of both desired and undesired signals can also transmit an indication as to which signals are desire (and thus should receive a beam/lobe) and which signals are undesired (and thus should receive a null signal).

In one or more examples, once the flight plan information for one or more airborne radios is received at step 802, the process 800 can move to step 804 wherein real-time signal information is provided to the antenna. In one or more examples, the beam/null steering antenna can be configured to only provide beams and nulls once a signal from an airborne radio is detected. Thus, in one or more examples, at step 804, the antenna can receive signal information indicating that an airborne radio has been detected in the coverage area of the antenna. In one or more examples, the antenna itself can receive the signal information or alternatively, the signal information can be provided by the spectrum monitoring device 528, which as described above, can be configured to monitor the RF spectrum of the coverage area of the base station. As an example, if a flight switches on its airborne radio (for instance before take-off), the spectrum monitoring device or the antenna itself can detect the presence of that signal at step 804 and collect the information.

As described above with respect to step 802, the beam/null steering antenna can receive prior knowledge about both desired and undesired signals and their flight plans. In one or more examples, using the flight plan information, the beam/null steering antenna can determine whether a signal detected at step 804 is a known desired signal, a known undesired signal, or an unknown undesired signal. In one or more examples, a signal received at step 804 can be cross-referenced with the flight plans received at step 802 to determine if the received signal belongs to one of the flight plans that have already been received at the beam/null steering antenna at step 802. For instance, if a pilot who has already filed a flight plan with the spectrum management turns their radio on before taking off, the spectrum monitoring device may detect the radio and send the signal information to the beam/null steering antenna. The beam/null steering antenna can use the flight plan information to determine that the signal is a known desired signal and can marshal resources at the antenna's disposal (i.e, the receive and transmit elements) to direct a beam/lobe in the direction of the aircraft's current position.

In one or more examples, and as shown at step 806, the process 800 can determine if a signal received at step 804 matches the expected location of a known desired signal (i.e., an aircraft performing its registered flight plan). If at step 806, the beam/null steering antenna determines that the signal received at step 804 is a desired known signal, then in one or more examples, the beam/null steering antenna can direct a beam (i.e., a lobe) at the location of the signal as shown at step 808. In one or more examples, the beam/null steering antenna can set the effective isotropic radiated power (EIRP) of the beam based on the estimated or measured distance of the location of the signal. For instance, the beam/null steering antenna transmitted EIRP can be directly proportional to the estimated/measured strength of the signal, thus, if the signal is further away the antenna can transmit at a higher EIRP versus if the signal is closer to the antenna. In one or more examples, the distance between the signal and the antenna can be based on the flight plan corresponding to the signal and/or the signal information received at step 804. In one or more examples, the beam/null forming antenna can implement automatic gain control to control the EIRP of the signal, adjusting the EIRP based not only on the distance of the aircraft (i.e., the signal) but also based on the characteristics of the radio it is transmitting the signal to (i.e., the airborne radio). In one or more examples, the beam/null antenna can use automatic gain control to ensure that a particular airborne radio receives a consistent EIRP at its receiver throughout the duration of its flight, and that the power will not fluctuate based on the airborne radio's distance from the beam/null antenna.

In one or more examples, instead of a base station having a fixed RF power amplifier that can be shared amongst the various channels (i.e., beams), each individual beam (i.e., RF channel) can having its own RF power amplifier, that can each use automatic gain control to transmit less power to an aircraft when the aircraft is close to the base station, and more power when the aircraft is further away. In one or more examples, by allowing for the beam/null forming antenna to transmit at lower power when aircraft is close, the likelihood that a particular beam will interfere with another beam is reduced. For instance reducing the power of a first beam, can reduce the Carrier-to-Interference and Noise Ratio (CINR) (e.g., SNR) for a beam at the same frequency being transmitted to another aircraft at an adjacent ground station.

In one or more examples, once the beam/null steering antenna points a beam at the signal in response to determining that the signal is a known desired signal, the process 800 can move to step 810 wherein the flight plan of that known desired signal is used to allow for the antenna to track the signal (i.e., move the lobe of the antenna in conjunction with the motion of the flight). By using the flight plan, the beam/null steering antenna can know where all the airborne radios of the network are located, or expected to be located, in the network at all times, including deviations which may be necessary based on updated/amended/appended flight plan filings—which can occur in real time based on instructions from air traffic control. This allows the planning and assignment of the traffic channels to include the benefit gained through the use of the beam/null steering antennas by ensuring the airborne radios are located in a predefined location that maximizes the effectiveness of the antenna system.

In one or more examples, in order to track a flight, the antenna can collect real-time telemetry information from the airborne radio it is tracking, and compare the telemetry information with the flight plan to ensure that the beam is tracking the airborne radio to its actual location. In one or more examples, the telemetry of location and elevation of the aircraft can also be provided by external resources such as GPS, Enhanced RTK GPS, and alternative GPS based upon triangulation of multiple ground-based navigation beacons, aircraft barometer, and radar altimeters.

Returning back to the example of FIG. 8, if a signal received at step 804 is determined to not be a known desired signal at step 806, then the process can move to step 812 wherein a determination is made as to whether the received signal is a known undesired signal. As described above, the beam/null steering antenna can receive flight plan information regarding both desired signals and the information regarding undesired interferers. If it is determined that the signal received at step 804 is not a known desired signal, then at step 812 the process 800 can check the signal against the flight plans of known undesired signals to determine if the received signal is a known undesired signal. In one or more examples, if it is determined at step 812 that the signal received at step 804 is a known undesired signal, then the process 800 can move to step 814 wherein the antenna can direct a null at the signal so as to minimize the interference it may cause with known desired signals in the network. In one or more examples, once the beam/null steering antenna points a null at the signal in response to determining that the signal is a known undesired signal, the process 800 can move to step 816 wherein the flight plan of that known undesired signal is used to allow for the antenna to track the signal (i.e., move the null of the antenna in conjunction with the motion of the flight).

If however at step 812, the antenna determines that signal received at step 804 is neither a known desired signal or a known undesired signal, then the process 800 can move to step 818 wherein the antenna can transmit a null to the location of the signal. In one or more examples of the disclosure, if a signal is not identified as known signal (either desired or undesired) because the signal does not match with any of the flight plans received by the antenna at step 802, then the beam/null steering antenna can assume that the signal is an undesired signal and can take the appropriate steps to minimize the interference that the signal may cause to known desired signals in the network. Thus, in one or more examples, at step 818 the antenna can direct a null at the signal location of the unknown undesired signal to mitigate any interference that may be caused by the signal.

In one or more examples, in addition to directing a null at an unknown signal, the null/beam steering antenna can also react to unknown sources of co-channel interference by tracking the null signal with the unknown airborne radio. In one or more examples, at step 820 the beam/null steering antenna can also send an alert to the spectrum monitoring system 528 so that the spectrum monitoring signal can identify the signal source by its RF signature and log the unknown signals as described above with respect to FIG. 5. In one or more examples, the signal monitor can determine the RF signature and other information about the unknown signal so that the interferer can be identified and located for swift resolution. The example of FIG. 8 is described with respect to a beam/null steering antenna that is located on a base station, but the example should not be seen as limiting, and the methods and techniques described above can also be applied to beam/null steering antennas located on the aircraft themselves.

Figure 9:
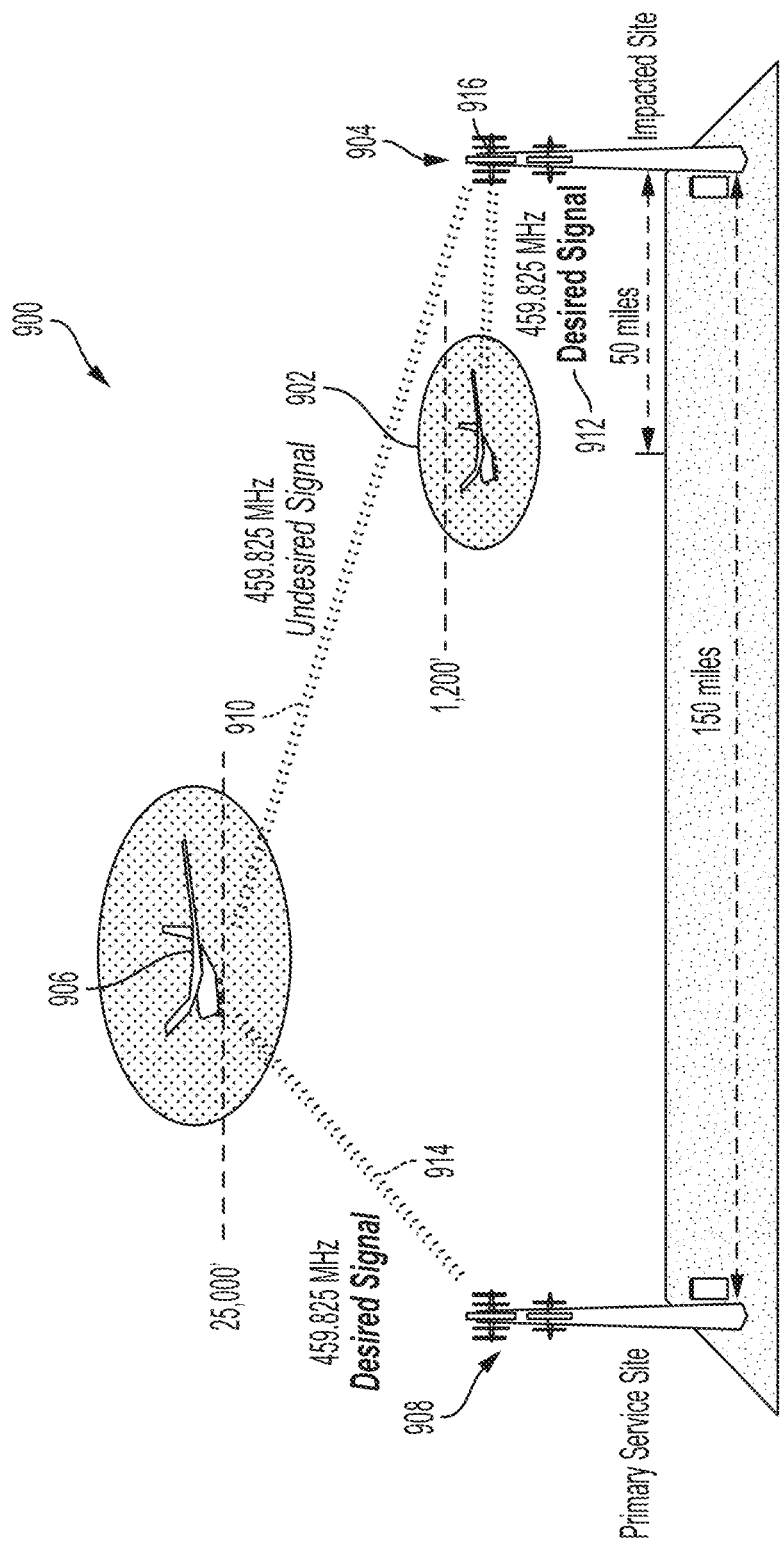
FIG. 9 illustrates an exemplary beam steering antenna system according to examples of the disclosure.

FIG. 9 illustrates an exemplary beam steering antenna system according to examples of the disclosure. FIG. 9 illustrates the exemplary beam steering antenna system in the context of a communications network 900 to better illustrate the features of the system. In one or more examples, communication network 900 can include two separate base stations 908 and base station 904. In one or more examples, base station 908 can transmit a desired signal 914 to an aircraft 906 that is transiting the coverage area of base station 908. In the example of FIG. 9, base station 908 is illustrated as transmitting an RF signal of 459.825 MHz. In one or more examples, the aircraft 906 can be flying at an altitude of 25,000 feet as shown in the figure.

In one or more examples, communications system 900 can also include a base station 904 that is operating in a coverage area that is adjacent to the coverage area of base station 908. In one or more examples, base station 904 can transmit a desired signal 912 to an aircraft 902 transiting its own coverage area at the same time that aircraft 906 is transmitting the coverage area of base station 908. In the example of FIG. 9, aircraft 902 is shown to be flying at 1,200 feet and communicating with base station 904 using an RF channel centered at 459.825 MHz, which is the same frequency that aircraft 906 is using to communicate with its corresponding base station 908.

As shown in FIG. 9, though aircraft 906 is operating at a different base station than aircraft 902, its communications with the base station 908 can cause interference with the communications of aircraft 902 with its base station 902. In one or more examples, owing to its relatively high altitude, the desired signal 914 of base station 908 (which is directed toward aircraft 906) can be seen by base station 904 in the form of undesired signal 910. Undesired signal 910, as it is caused by the communications between base station 908 and aircraft 906, can be at 459.825 MHz, which is the same frequency as signal 912 between aircraft 902 and base station 904. Thus, the undesired signal 910 can cause interference with the desired signal 912.

In one or more examples, using the spectrum monitoring device described above with respect to FIG. 7 as well as a base station link monitoring tool (described in detail below), the spectrum management system 522 knowledge of all known airborne radios on the network can validate or detect the presence of a known or unknown undesired signal 910 and utilize a beam/null forming steering antenna 916 that is mounted to a tower of the base station 904 to substantially reduce or eliminate the undesired signal 910 from the RF spectrum environment of aircraft 902. In one or more examples, the beam/null forming steering antenna 916 can be configured as a steerable antenna that can be pointed in the direction of an undesired signal. In one or more examples, the beam/null forming steering antenna 916 can be implemented a phased array antenna with beam forming functionality that can be configured to transmit RF energy in a specific desired direction. In one or more examples, the direction of the beam can be controlled by a base station controller connected to the base station 904 or by the spectrum management system 522 directly.

In one or more examples, if the spectrum management system 522 detects an undesired signal at a particular base station in the network, the spectrum management system 522, using the spectrum monitoring device, can determine the direction of the signal as well as the power of the signal (for instance by using direction/power detection component 612). Once the spectrum management system 522 has determined the power and direction of the undesired signal it can relay the information to the beam steering antenna 916 to form a null in the direction of the undesired signal and with the introduction of noise cancelling techniques like Successive Noise Cancellation and Multi User Detection together can substantially reduce the impact of the undesired signal in the RF coverage area of the base station 904.

Referring back to FIG. 5, in addition to the spectrum monitoring device 528, and the beam/null forming steering antenna 530, in one or more examples, the base station 526 includes a base station link monitoring functionality 532. In one or more examples, the base station link monitoring functionality 532 monitors each of the individual links that are assigned by the spectrum management system 522 at the base station 526. While the spectrum monitoring functionality 528 is configured to monitor all the active radio links individually of the base station 526, and can update real time the spectrum management system 522 to validate and adjust as needed the individual link predicted performance and utilization by the aircraft and operator.

In one or more examples, if the spectrum management system 522 detects conditions or interference of all communication links in the network, then it can work to mitigate any degradation in performance by adjusting the dynamic link budget, updating the dynamic RF coverage predictions implementing the beam/null forming steering antenna capabilities to apply a null at a detected source of interference and notify the operator of any coverage change. However, in one or more examples, if the spectrum management system 522 is unable to mitigate a situation through the techniques describe above, then the spectrum management system 522 can change the RF spectrum channel allocation of an individual aircraft in the network so as to find a more favorable communications channel for use. Thus, in one or more examples, the base station can include one or more sub-channel and resource blocks 534 that are reserved by the system to allocate to aircraft in-flight who may be experiencing service issues and need to change their frequency.

As described above, the spectrum management system 522 can setup and monitor a communications link for the duration of a flight, and has the capability to take action should a reliable and continuous communication link become threatened during a flight. In conjunction with the digital twin 504, the entire system can plan a communications channel for flight, implement the communications for the flight, and respond to issues with the communications links of flight during the flight.

Figure 10:
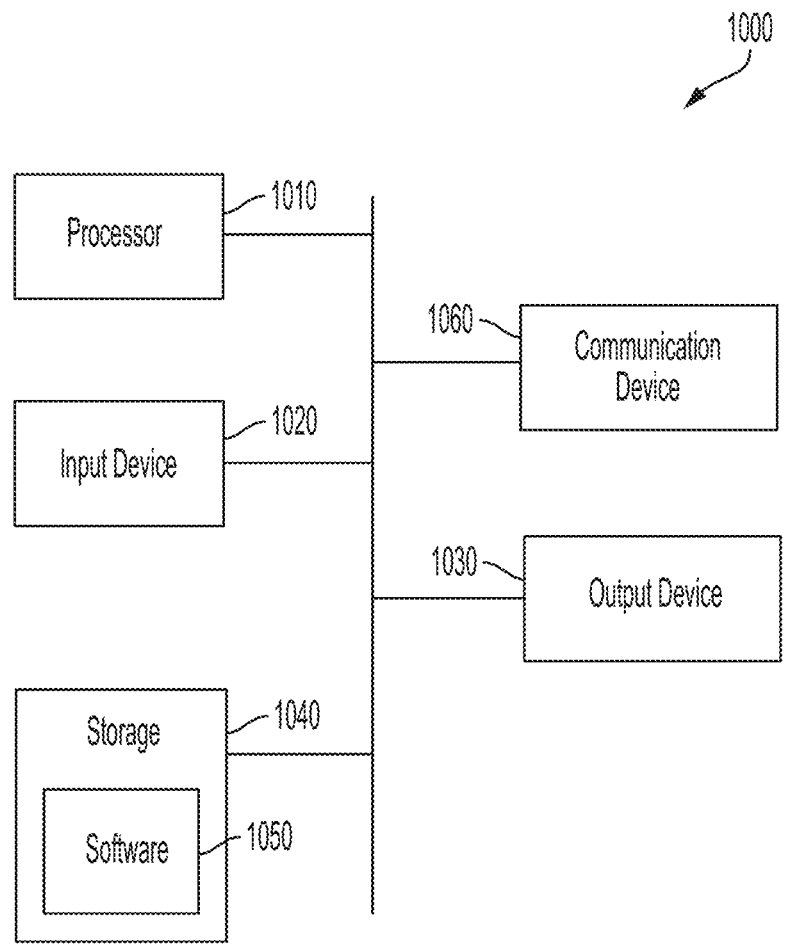
FIG. 10 illustrates an exemplary computing system, according to examples of the disclosure.

FIG. 10 illustrates an example of a computing system 1000, in accordance with some embodiments System 1000 can be a client or a server. As shown in FIG. 10, system 1000 can be any suitable type of processor-based system, such as a personal computer, workstation, server, handheld computing device (portable electronic device) such as a phone or tablet, or dedicated device. The system 1000 can include, for example, one or more of input device 1020, output device 1030, one or more processors 1010, storage 1040, and communication device 1060. Input device 1020 and output device 1030 can generally correspond to those described above and can either be connectable or integrated with the computer.

Input device 1020 can be any suitable device that provides input, such as a touch screen, keyboard or keypad, mouse, gesture recognition component of a virtual/augmented reality system, or voice-recognition device. Output device 1030 can be or include any suitable device that provides output, such as a display, touch screen, haptics device, virtual/augmented reality display, or speaker.

Storage 1040 can be any suitable device that provides storage, such as an electrical, magnetic, or optical memory including a RAM, cache, hard drive, removable storage disk, or other non-transitory computer readable medium. Communication device 1060 can include any suitable device capable of transmitting and receiving signals over a network, such as a network interface chip or device. The components of the computing system 1000 can be connected in any suitable manner, such as via a physical bus or wirelessly.

Processor(s) 1010 can be any suitable processor or combination of processors, including any of, or any combination of, a central processing unit (CPU), field programmable gate array (FPGA), and application-specific integrated circuit (ASIC). Software 1050, which can be stored in storage 1040 and executed by one or more processors 1010, can include, for example, the programming that embodies the functionality or portions of the functionality of the present disclosure (e.g., as embodied in the devices as described above)

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport computer readable medium can include, but is not limited to, an electronic, magnetic, optical, electromagnetic, or infrared wired or wireless propagation medium.

System 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

System 1000 can implement any operating system suitable for operating on the network. Software 1050 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated. For the purpose of clarity and a concise description, features are described herein as part of the same or separate embodiments; however, it will be appreciated that the scope of the disclosure includes embodiments having combinations of all or some of the features described.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method for operating a beam and null steerable antenna, the method comprising:
receiving one or more flight plans, wherein each flight plan of the one or more flight plans comprises timing, location, and altitude information for an aircraft that is to fly in one or more coverage areas of an aviation communications network;
receiving signal information, wherein the signal information comprises location information for a signal being transmitted in the one or more coverage areas of the aviation communications network;
determining that the received signal information matches a flight plan of the one or more received flight plans;
in response to determining that the received signal information matches the flight plan of the one or more received flight plans:
operating one or more elements of the antenna to point a beam to a location indicated by the location information of the received signal information, wherein the beam is configured to transmit a communications signal between the antenna and the aircraft; and
adjusting the location pointed to by the beam by adjusting the one or more elements of the antenna based on the flight plan so that the location pointed to by the beam is a pre-defined area that the aircraft is expected to be located, wherein the pre-defined area is determined based on the flight plan.

2. The method of claim 1, wherein the flight plan comprises information about the radio configuration of the aircraft performing the flight plan.

3. The method of claim 2, wherein the one or more elements of the antenna are operated based on the information about the radio configuration of the aircraft performing the flight plan.

4. The method of claim 1, wherein the flight plan comprises information about whether an airborne radio associated with the flight plan is a desired signal, and wherein the beam and null steerable antenna is configured to point an RF beam at a desired signal so as to maintain a communications link between the airborne radio associated with the desired signal and the antenna.

5. The method of claim 1, wherein the flight plan comprises information about whether an airborne radio associated with the flight plan is an undesired signal, and wherein the beam and null steerable antenna is configured to point an RF null at an undesired signal so as to reduce RF interference caused by the undesired signal.

6. The method of claim 1, wherein the signal information is received from a spectrum monitoring device configured to receive and process radio frequency (RF) signals received at a monitoring antenna of the base station.

7. The method of claim 1, wherein the flight plan comprises information about whether an airborne radio associated with the flight plan is a desired signal, and wherein determining if the received signal information matches a flight plan of the one or more received flight plans comprises determining if the received signal information matches a flight plan of a desired signal.

8. The method of claim 7, wherein the method comprises:
if the received signal information matches a flight plan of a desired signal:
operating the one or more elements of the antenna to transmit a RF beam in a direction associated with the location information for the signal being transmitted in the one or more coverage areas of the aviation communications network.

9. The method of claim 8, wherein the method comprises:
if the received signal information matches a flight plan of a desired signal:
operating the one or more elements of the antenna to track the received signal based on the flight plan of the desired signal that is determined to match the received signal.

10. The method of claim 7, wherein the flight plan comprises information about whether an airborne radio associated with the flight plan is an undesired signal, and wherein determining if the received signal information matches a flight plan of the one or more received flight plans comprises determining if the received signal information matches a flight plan of a undesired signal.

11. The method of claim 10, wherein the method comprises:
if the received signal information matches a flight plan of a undesired signal:
operating the one or more elements of the antenna to transmit a RF null in a direction associated with the location information for the signal being transmitted in the one or more coverage areas of the aviation communications network.

12. The method of claim 11, wherein the method comprises:
if the received signal information matches a flight plan of an undesired signal:
operating the one or more elements of the antenna to track the received signal based on the flight plan of the undesired signal that is determined to match the received signal.

13. The method of claim 10, wherein if the received signal information does not match a flight plan of a desired signal or an undesired signal then the method comprises:
operating the one or more elements of the antenna to transmit a RF null in a direction associated with the location information for the signal being transmitted in the one or more coverage areas of the aviation communications network.

14. The method of claim 13, wherein if the received signal information does not match a flight plan of a desired signal or an undesired signal:
transmitting the signal information to a spectrum monitoring device configured to receive and process radio frequency (RF) signals received at a monitoring antenna of the base station, wherein the spectrum monitoring device is configured to determine information associated with an identity of an airborne radio associated with the signal information received from the beam and null steering antenna.

15. The method of claim 1, wherein tracking the signal with the one or more elements of the antenna based on the flight plan of the one or more flight plans that matches the received signal information comprises adjusting the location of the transmitted signal based on the flight plan.

16. A beam and null steerable antenna, the beam and null steerable antenna comprising:
one or more elements configured to receive and transmit RF energy;
a memory;
one or more processors;
wherein the memory stores one or more programs that when executed by the one or more processors, cause the one or more processors to:
receive one or more flight plans, wherein each flight plan of the one or more flight plans comprises timing, location, and altitude information for a flight that is to fly in one or more coverage areas of an aviation communications network;
receive signal information, wherein the signal information comprises location information for a signal being transmitted in the one or more coverage areas of the aviation communications network;
determine that the received signal information matches a flight plan of the one or more received flight plans;
in response to determining that the received signal information matches the flight plan of the one or more received flight plans:
operate the one or more elements of the antenna to point a beam to a location indicated by the location information of the received signal information, wherein the beam is configured to transmit a communications signal between the antenna and the aircraft; and
adjust the location pointed to by the beam by adjusting the one or more elements of the antenna based on the flight plan so that the location pointed to by the beam is a pre-defined area that the aircraft is expected to be located, wherein the pre-defined area is determined based on the flight plan.

17. The beam and null steerable antenna of claim 16, wherein the flight plan comprises information about the radio configuration of the aircraft performing the flight plan.

18. The beam and null steerable antenna of claim 17, wherein the one or more elements of the antenna are operated based on the information about the radio configuration of the aircraft performing the flight plan.

19. The beam and null steerable antenna of claim 16, wherein the flight plan comprises information about whether an airborne radio associated with the flight plan is a desired signal, and wherein the beam and null steerable antenna is configured to point an RF beam at a desired signal so as to maintain a communications link between the airborne radio associated with the desired signal and the antenna.

20. The beam and null steerable antenna of claim 16, wherein the flight plan comprises information about whether an airborne radio associated with the flight plan is an undesired signal, and wherein the beam and null steerable antenna is configured to point an RF null at an undesired signal so as to reduce RF interference caused by the undesired signal.

21. The beam and null steerable antenna of claim 16, wherein the signal information is received from a spectrum monitoring device configured to receive and process radio frequency (RF) signals received at a monitoring antenna of the base station.

22. The beam and null steerable antenna of claim 16, wherein the flight plan comprises information about whether an airborne radio associated with the flight plan is a desired signal, and wherein determining if the received signal information matches a flight plan of the one or more received flight plans comprises determining if the received signal information matches a flight plan of a desired signal.

23. The beam and null steerable antenna of claim 22, wherein the one or more processors are caused to:
if the received signal information matches a flight plan of a desired signal:
operate the one or more elements of the antenna to transmit a RF beam in a direction associated with the location information for the signal being transmitted in the one or more coverage areas of the aviation communications network.

24. The beam and null steerable antenna of claim 23, wherein the one or more processors are caused to:
if the received signal information matches a flight plan of a desired signal:
operate the one or more elements of the antenna to track the received signal based on the flight plan of the desired signal that is determined to match the received signal.

25. The beam and null steerable antenna of claim of claim 22, wherein the flight plan comprises information about whether an airborne radio associated with the flight plan is an undesired signal, and wherein determining if the received signal information matches a flight plan of the one or more received flight plans comprises determining if the received signal information matches a flight plan of a undesired signal.

26. The beam and null steerable antenna of claim 25, wherein the one or more processors are caused to:
if the received signal information matches a flight plan of a undesired signal:
operate the one or more elements of the antenna to transmit a RF null in a direction associated with the location information for the signal being transmitted in the one or more coverage areas of the aviation communications network.

27. The beam and null steerable antenna of claim 26, wherein the one or more processors are caused to:
if the received signal information matches a flight plan of an undesired signal:
operate the one or more elements of the antenna to track the received signal based on the flight plan of the undesired signal that is determined to match the received signal.

28. The beam and null steerable antenna of claim 25, wherein if the received signal information does not match a flight plan of a desired signal or an undesired signal then the one or more processors are caused to:
operate the one or more elements of the antenna to transmit a RF null in a direction associated with the location information for the signal being transmitted in the one or more coverage areas of the aviation communications network.

29. The beam and null steerable antenna of claim 28, wherein if the received signal information does not match a flight plan of a desired signal or an undesired signal then the one or more processors are caused to:
transmit the signal information to a spectrum monitoring device configured to receive and process radio frequency (RF) signals received at a monitoring antenna of the base station, wherein the spectrum monitoring device is configured to determine information associated with an identity of an airborne radio associated with the signal information received from the beam and null steering antenna.

30. The beam and null steerable antenna of claim 16, wherein tracking the signal with the one or more elements of the antenna based on the flight plan of the one or more flight plans that matches the received signal information comprises adjusting the location of the transmitted signal based on the flight plan.

31. A non-transitory computer readable storage medium storing one or more programs for operating a beam and null steerable antenna, for execution by one or more processors of an electronic device that when executed by the device, cause the device to:
receive one or more flight plans, wherein each flight plan of the one or more flight plans comprises timing, location, and altitude information for a flight that is to fly in one or more coverage areas of an aviation communications network;
receive signal information, wherein the signal information comprises location information for a signal being transmitted in the one or more coverage areas of the aviation communications network;
determine that the received signal information matches a flight plan of the one or more received flight plans;
in response to determining that the received signal information matches the flight plan of the one or more received flight plans:
operate the one or more elements of the antenna to point a beam to a location indicated by the location information of the received signal information, wherein the beam is configured to transmit a communications signal between the antenna and the aircraft; and
adjust the location pointed to by the beam by adjusting the one or more elements of the antenna based on the flight plan so that the location pointed to by the beam is a pre-defined area that the aircraft is expected to be located, wherein the pre-defined area is determined based on the flight plan.

32. The non-transitory computer readable storage medium of claim 31, wherein the flight plan comprises information about the radio configuration of the aircraft performing the flight plan.

33. The non-transitory computer readable storage medium of claim 32, wherein the one or more elements of the antenna are operated based on the information about the radio configuration of the aircraft performing the flight plan.

34. The non-transitory computer readable storage medium of claim 31, wherein the flight plan comprises information about whether an airborne radio associated with the flight plan is a desired signal, and wherein the beam and null steerable antenna is configured to point an RF beam at a desired signal so as to maintain a communications link between the airborne radio associated with the desired signal and the antenna.

35. The non-transitory computer readable storage medium of claim 31, wherein the flight plan comprises information about whether an airborne radio associated with the flight plan is an undesired signal, and wherein the beam and null steerable antenna is configured to point an RF null at an undesired signal so as to reduce RF interference caused by the undesired signal.

36. The non-transitory computer readable storage medium of claim 31, wherein the signal information is received from a spectrum monitoring device configured to receive and process radio frequency (RF) signals received at a monitoring antenna of the base station.

37. The non-transitory computer readable storage medium of claim 31, wherein the flight plan comprises information about whether an airborne radio associated with the flight plan is a desired signal, and wherein determining if the received signal information matches a flight plan of the one or more received flight plans comprises determining if the received signal information matches a flight plan of a desired signal.

38. The non-transitory computer readable storage medium of claim 37, wherein the device is caused to:
  if the received signal information matches a flight plan of a desired signal:
    operate the one or more elements of the antenna to transmit a RF beam in a direction associated with the location information for the signal being transmitted in the one or more coverage areas of the aviation communications network.

39. The non-transitory computer readable storage medium of claim 38, wherein the device is caused to:
  if the received signal information matches a flight plan of a desired signal:
    operate the one or more elements of the antenna to track the received signal based on the flight plan of the desired signal that is determined to match the received signal.

40. The non-transitory computer readable storage medium of claim 38, wherein the flight plan comprises information about whether an airborne radio associated with the flight plan is an undesired signal, and wherein determining if the received signal information matches a flight plan of the one or more received flight plans comprises determining if the received signal information matches a flight plan of a undesired signal.

41. The non-transitory computer readable storage medium of claim 40, wherein the device is caused to:
  if the received signal information matches a flight plan of a undesired signal:
    operate the one or more elements of the antenna to transmit a RF null in a direction associated with the location information for the signal being transmitted in the one or more coverage areas of the aviation communications network.

42. The non-transitory computer readable storage medium of claim 41, wherein the device is caused to:
  if the received signal information matches a flight plan of an undesired signal:
    operate the one or more elements of the antenna to track the received signal based on the flight plan of the undesired signal that is determined to match the received signal.

43. The non-transitory computer readable storage medium of claim 41, wherein if the received signal information does not match a flight plan of a desired signal or an undesired signal then device is caused to:
  operate the one or more elements of the antenna to transmit a RF null in a direction associated with the location information for the signal being transmitted in the one or more coverage areas of the aviation communications network.

44. The non-transitory computer readable storage medium of claim 43, wherein if the received signal information does not match a flight plan of a desired signal or an undesired signal, the device is caused to:
  transmit the signal information to a spectrum monitoring device configured to receive and process radio frequency (RF) signals received at a monitoring antenna of the base station, wherein the spectrum monitoring device is configured to determine information associated with an identity of an airborne radio associated with the signal information received from the beam and null steering antenna.

45. The non-transitory computer readable storage medium of claim 31, wherein tracking the signal with the one or more elements of the antenna based on the flight plan of the one or more flight plans that matches the received signal information comprises adjusting the location of the transmitted signal based on the flight plan.

* * * * *